United States Patent
Frings et al.

(10) Patent No.: US 8,703,898 B2
(45) Date of Patent: *Apr. 22, 2014

(54) HYPERBRANCHED POLYETHER POLYOL AND URETHANE RESIN COMPOSITION

(75) Inventors: Rainer B. Frings, Berlin (DE); Toshihiro Ooki, Takaishi (JP); Yasuhiro Takada, Takaishi (JP); Hitoshi Hayakawa, Sakura (JP)

(73) Assignee: DIC Corporation, Tokyo (JP)

( * ) Notice: Subject to any disclaimer, the term of this patent is extended or adjusted under 35 U.S.C. 154(b) by 1024 days.

This patent is subject to a terminal disclaimer.

(21) Appl. No.: 12/308,656

(22) PCT Filed: Jun. 20, 2006

(86) PCT No.: PCT/JP2006/312327
§ 371 (c)(1),
(2), (4) Date: Dec. 19, 2008

(87) PCT Pub. No.: WO2007/148383
PCT Pub. Date: Dec. 27, 2007

(65) Prior Publication Data
US 2009/0286940 A1 Nov. 19, 2009

(51) Int. Cl.
*C08G 18/48* (2006.01)
*C08G 65/26* (2006.01)
*C08G 18/72* (2006.01)
*C08G 65/22* (2006.01)
*C08G 65/18* (2006.01)
*C08L 75/08* (2006.01)

(52) U.S. Cl.
USPC ............. 528/77; 528/417; 528/421; 528/411; 528/416; 528/67; 528/73

(58) Field of Classification Search
USPC ................................................. 528/417, 421
See application file for complete search history.

(56) References Cited

U.S. PATENT DOCUMENTS

| 4,195,167 | A | * | 3/1980 | Knopf et al. | 528/408 |
| 4,972,004 | A | | 11/1990 | Randall et al. | |
| 5,091,437 | A | | 2/1992 | Lunardon et al. | |
| 7,091,308 | B2 | * | 8/2006 | Haggman et al. | 528/417 |
| 2003/0176591 | A1 | | 9/2003 | Haggman et al. | |
| 2004/0106769 | A1 | | 6/2004 | Hatton et al. | |

FOREIGN PATENT DOCUMENTS

| CN | 1380345 A | 11/2002 |
| JP | 45-272 | 1/1970 |
| JP | 57-092015 | 6/1982 |
| JP | 1-190721 | 7/1989 |
| JP | 4-185627 | 7/1992 |
| JP | 2001-187863 | 7/2001 |

(Continued)

OTHER PUBLICATIONS

Yiyong Mai et al., "Synthesis and Size-Controllable Self-Assembly of a Novel Amphiphilic Hyperbranched Multiarm Copolyether," Macromolecules, 2005, vol. 38, pp. 8679-8686.

(Continued)

*Primary Examiner* — Randy Gulakowski
*Assistant Examiner* — Rachel Kahn
(74) *Attorney, Agent, or Firm* — Edwards Wildman Palmer LLP; James E. Armstrong, IV

(57) ABSTRACT

A hyperbranched polyether polyol obtained by a ring-opening reaction between a hydroxyalkyloxetane (a1) and a monofunctional epoxy compound (a2), wherein the polyether polyol includes a primary hydroxyl group (H1) and a secondary hydroxyl group (H2) in the molecular structure thereof, and has a number average molecular weight (Mn) of 1,000 to 4,000 and a hydroxyl value of 150 to 350 mg·KOH/g.

9 Claims, 13 Drawing Sheets

(56) References Cited

FOREIGN PATENT DOCUMENTS

| JP | 2003064150 A | * | 3/2003 |
| JP | 2004-502847 | | 1/2004 |
| JP | 2004-509982 | | 4/2004 |
| JP | 2004-149771 | | 5/2004 |
| JP | 2005068292 A | * | 3/2005 |
| JP | 4129696 | | 3/2008 |
| WO | WO-0210189 A2 | | 2/2002 |
| WO | WO-03/062306 A1 | | 7/2003 |
| WO | WO-03062306 A1 | | 7/2003 |

OTHER PUBLICATIONS

International Search Report mailed Aug. 22, 2006, issued on PCT/JP2006/312327.

Office Action mailed Dec. 25, 2007, issued on Japanese Patent Application No. 2005-100813 (Japanese Patent No. 4114012) and the English translation thereof.

Office Action mailed Dec. 25, 2007, issued on Japanese Patent Application No. 2007-284650 (Japanese Patent No. 4129696) and the English translation thereof.

Office Action mailed Jun. 23, 2011 issued on Taiwan Patent Application No. 095121593.

Supplementary European Search Report issued in EP 06766988.7, mailed Feb. 2, 2012.

Mai et al. "Synthesis and Size-Controllable Self-Assembly of a Novel Amphiphilic Hyperbranched Multiarm Copolyether." Macromolecules 2005, 38, 8679-8686.

* cited by examiner

HYPERBRANCHED POLYETHER POLYOL AND URETHANE RESIN COMPOSITION

TECHNICAL FIELD

The present invention relates to a hyperbranched polyether polyol and a urethane resin composition.

BACKGROUND ART

Urethane resin compositions formed from a polyol component and a polyisocyanate component have been widely used as a covering material or the like, which is usable for a floor member or the like of an architectural member, since the urethane resin compositions have characteristics such that they are excellent in curability and excellent in elongation of a cured film obtained from the urethane resin composition. However, there are problems in that cured products obtained from the urethane resin compositions are generally soft, and the appearance of a coated film thereof is poor since the coated film is easily foamed due to moisture absorption thereof. Accordingly, in recent years, various studies for improving a hard type urethane resin composition have been conducted (for example, Patent Document 1).

On the other hand, in order to improve the hardness of a covering material, increasing the reactivity of a polyol component and a polyisocyanate component has been accomplished in general. However, when the reactivity is too high, there are problems in that sufficient pot life is not obtained, that is, a sufficient period, wherein a prepared resin composition is maintained in useable condition without being cured, is not obtained, since said components react to each other speedily once both components are mixed.

Therefore, it has been known conventionally that a hard type urethane resin composition, which can be used for a covering, ensures a sufficient pot life, and generates minimal foam even under conditions of high temperature and high humidity, can be prepared by using a mixture, in which of a castor oil fatty acid and a polyol having a structure wherein a higher fatty acid is reacted with a bisphenol type epoxy resin are mixed, as a polyol component, and a mixture, in which diphenylmethane diisocyanate (abbreviated to MDI) and polymethylene polyphenyl polyisocyanate (abbreviated to polymeric MDI) are mixed in a predetermined ratio, as polyisocyanate components (refer to Patent Document 2 shown below).

The aforementioned technique, wherein a mixture of a castor oil fatty acid and a polyol having the structure in which higher fatty acid is reacted with a bisphenol type epoxy resin is used as a polyol component, and a mixture of MDI and polymeric MDI which are mixed in a predetermined ratio are used as a polyisocyanate component, ensures a long pot life and the formation of a hard coating. However, due to the remarkably high viscosity of the polyol component included in the urethane resin composition, it is hard for the technique to be adopted to coating methods such as brush coating, roller coating and spray coating, which can be conducted without skill and do not generate spots on the finished surface after coating.

Furthermore, a polyurethane resin which uses a diol prepared by copolymerizing an oxetane compound with tetrahydrofuran has been known. However, the resin does not ensure a sufficient pot life nor high hardness (refer to Patent document.)

Patent Document 1: Japanese Unexamined Patent Application, First Publication No. Sho 57-92015

Patent Document 2: Japanese Unexamined Patent Application, First Publication No. 2001-187863

Patent Document 3: Japanese Unexamined Patent Application, First Publication No. 2004-149771

DISCLOSURE OF INVENTION

Problems to be Solved by the Invention

Subjects to be achieved by the present invention are to provide a new polyether polyol which has remarkably low viscosity and can ensure a sufficient pot life and provide high hardness to a cured film when it is used as at least one constituent of a polyol component of a urethane resin composition; and to provide a urethane resin composition which comprises the aforementioned polyether polyol and is excellent in coating hardness and workability.

Means for Solving the Problems

The inventors of the preset invention studied and made every effort to achieve the above subjects. As a result, they found a compound and a urethane resin composition including the compound and achieve the present invention, wherein the compound and the composition are possible to increase a pot life of the urethane resin composition, achieve high hardness of a film obtained from the composition due to increased crosslinking density at the time of curing, and achieve low viscosity of the urethane resin composition due to small inertia radius of the compound. The urethane resin composition includes the compound as a polyol component, wherein the compound has a hyperbranched structure obtained by copolymerizing a hydroxyalkyloxetane and a monofunctional epoxy compound by ring-opening reaction, the compound has a primary hydroxyl group and a secondary hydroxyl group, and furthermore the compound has a predetermined average molecular weight and a predetermined total hydroxyl value.

That is, the present invention provides a hyperbranched polyether polyol obtained by a ring-opening reaction between a hydroxyalkyloxetane (a1) and a monofunctional epoxy compound (a2), wherein the polyether polyol includes a primary hydroxyl group (H1) and a secondary hydroxyl group (H2) in the molecular structure thereof, and has a number average molecular weight (Mn) of 1,000 to 4,000 and a hydroxyl value of 150 to 350 mg·KOH/g.

Furthermore, the present invention relates to a urethane resin composition which comprises a polyol component (A) and a polyisocyanate component (B) as essential components, and the aforementioned hyperbranched polyether polyol is used as the polyol component (A).

Effects of the Invention

Due to the present invention, it is possible to provide a polyether polyol which can ensure a sufficient pot life, provide high hardness to a cured film and greatly decrease the mixture viscosity of a resin composition, when the polyether polyol is used as a polyol component of a urethane resin composition. Furthermore, the urethane resin composition which includes the polyether polyol can achieve both excellent workability and coating hardness.

BEST MODE FOR CARRYING OUT THE INVENTION

Figure 1:
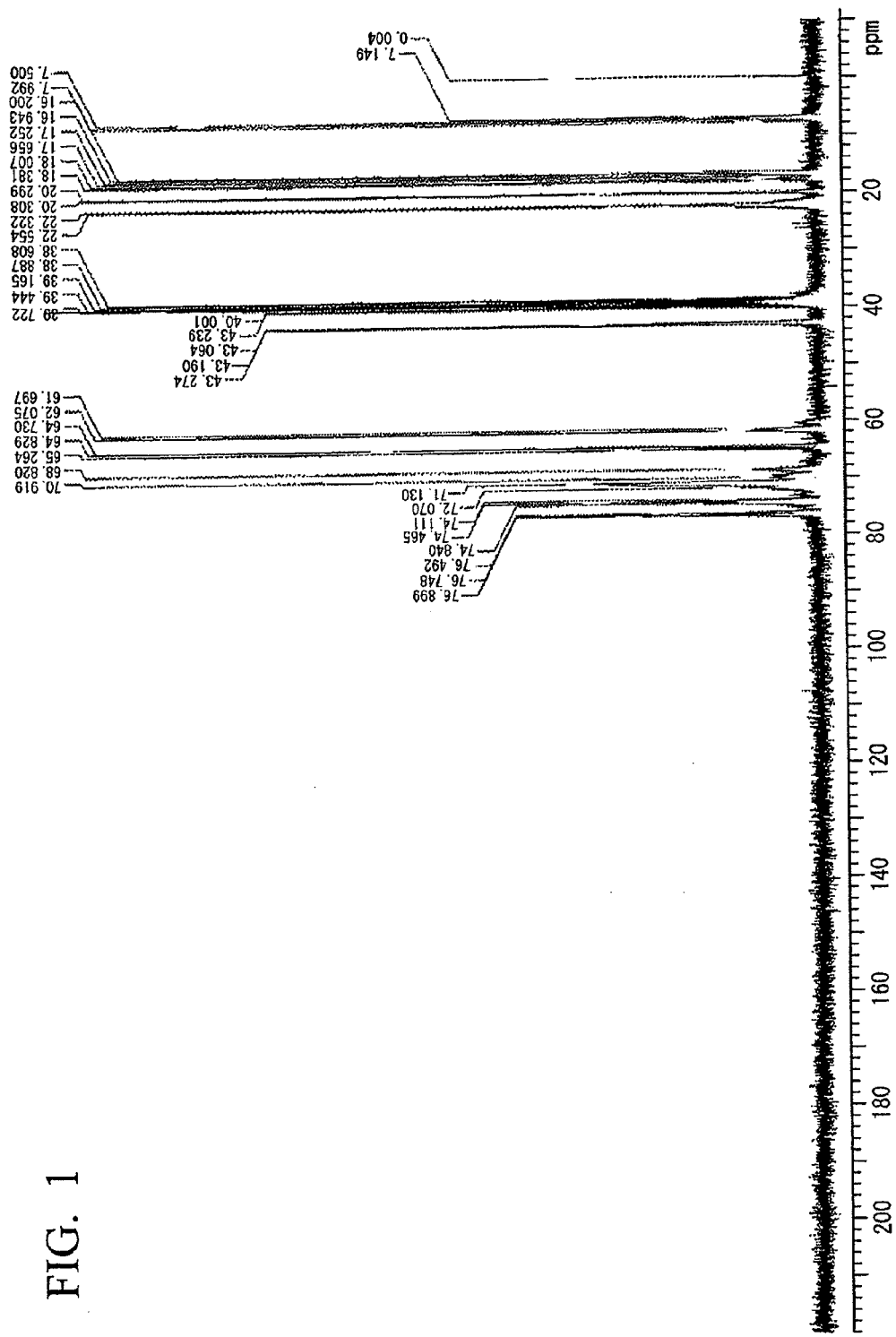
FIG. 1 is a chart of $^{13}$C-NMR of a hyperbranched polyether polyol obtained in Example 1.

Hereinafter, the present invention is explained in detail using preferable examples. However, the present invention is not limited only to the following examples.

A hyperbranched polyether polyol of the present invention is a hyperbranched polyether polyol which can be obtained by a ring-opening reaction between a hydroxyalkyloxetane (a1) and a monofunctional epoxy compound (a2). In the present invention, it is assumes that the hyperbranched polyether polyol has the structure described above, and therefore, the radius of gyration of the hyperbranched polyether polyol is small and tangles between molecules thereof are small, and as the result, the mixture viscosity of the urethane resin composition can decrease. Here, "hyperbranched" described in the present invention means that the molecular structure has a branched structure which is further branched at the branched terminal end.

Any hydroxyalkyloxetane compound can be used as the hydroxyalkyloxetane (a1) used in the present invention, in so far as problems are not caused. The hydroxyalkyloxetane (a1) can be used singly or in combination of two or more. For example, a compound having the structure represented by the following formula (1) can be cited as an example of the hydroxyalkyloxetane (a1).

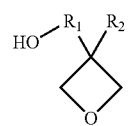

(1)

Here, in the general formula (1), $R_1$ represents a methylene group, an ethylene group or a propylene group, and $R_2$ represents a hydrogen atom, an alkyl group having 1 to 8 carbon atoms, an alkoxyalkyl group having 1 to 5 carbon atoms or a hydroxyalkyl group having 1 to 6 carbon atoms. Examples of the alkyl group having 1 to 8 carbon atoms include a methyl group, an ethyl group, an n-propyl group, an i-propyl group and a 2-ethylhexyl group. Examples of the alkoxyalkyl group having 1 to 5 carbon atoms include a methoxymethyl group, an ethoxymethyl group, a propoxymethyl group, a methoxyethyl group, an ethoxyethyl group and a propoxyethyl group. Examples of the hydroxyalkyl group having 1 to 3 carbon atoms include a hydroxymethyl group, a hydroxyethyl group and a hydroxypropyl group.

Among the examples of the hydroxyalkyloxetane (a1) represented by the general formula (1), a compound wherein $R_1$ represents a methylene group and $R_2$ represents an alkyl group having 1 to 7 carbon atoms are preferable because high hardness of a cured product can be achieved and viscosity can be reduced effectively due to the small radius of gyration thereof. Among the examples, 3-hydroxymethyl-3-ethyloxetane and 3-hydroxymethyl-3-methyloxetane are especially preferable.

Any monofunctional epoxy compound can be used as the monofunctional epoxy compound (a2), which is used for a ring-opening reaction with the hydroxyalkyloxetane (a1), in so far as problems are not caused. The monofunctional epoxy compound (a2) can be used singly or in combination of two or more. Examples thereof include an olefin epoxide, a glycidyl ether compound and a glycidyl ester compound.

The olefin epoxide is not limited in particular. Concrete examples thereof include propylene oxide, 1-butene oxide, 1-pentene oxide, 1-hexene oxide, 1,2-epoxy octane, 1,2-epoxy dodecane, cyclohexene oxide, cyclooctene oxide, cyclododecene oxide, styrene oxide, and fluoroalkyl epoxide having 1 to 18 fluorine atoms.

The glycidyl ether compound is not limited in particular. Concrete examples thereof include methyl glycidyl ether, ethyl glycidyl ether, n-propyl glycidyl ether, i-propyl glycidyl ether, n-butyl glycidyl ether, i-butyl glycidyl ether, n-pentyl glycidyl ether, 2-ethyl hexyl glycidyl ether, undecyl glycidyl ether, hexadecyl glycidyl ether, aryl glycidyl ether, phenyl glycidyl ether, 2-methyl phenyl glycidyl ether, 4-t-butyl phenyl glycidyl ether, 4-nonyl phenyl glycidyl ether, 4-methoxy phenyl glycidyl ether and fluoroalkyl glycidyl ether which has 1 to 18 fluorine atoms.

The glycidyl ester compound is not limited in particular. Concrete examples thereof include glycidyl acetate, glycidyl propionate, glycidyl butyrate, glycidyl methacrylate and glycidyl benzoate.

Among these compounds, olefin epoxide is preferably used since high coating hardness can be achieved and molecular weight of the hyperbranched polyether polyol can decrease. Propylene oxide, 1-butene oxide, 1-pentene oxide and 1-hexene oxide are particularly preferable.

Any method can be used for conducting the ring-opening reaction wherein a hydroxyalkyloxetane (a1) and a monofunctional epoxy compound (a2) are used for raw materials, in so far as problems are not caused. Concrete examples thereof include the following methods (1) to (4). The conditions of the methods can be changed if necessary.

(Method 1)

A hydroxyalkyloxetane (a1) and a monofunctional epoxy compound (a2) as raw material components are mixed in a ratio (molar basis) of a hydroxyalkyloxetane (a1) to a monofunctional epoxy compound (a2) is 1:1 to 1:10, preferably 1:1 to 1:6 and more preferably 1:1 to 1:3. The prepared mixture is mixed and dissolved in an organic solvent, which does not include peroxide, such as diethyl ether, di-i-propyl ether, di-n-butyl ether, di-i-butyl ether, di-t-butyl ether, t-amyl methyl ether, t-butyl methyl ether, cyclopentyl methyl ether or dioxolane, so that the mass ratio of raw material components ((a1)+(a2)) to an organic solvent is 1:1 to 1:5, preferably 1:1.5 to 1:4 and more preferably 1:1.5 to 1:2.5 to prepare a raw material solution.

The obtained raw material solution is cooled, preferably to −10 to −15° C., while it is stirred. Next, a polymerization initiator is added dropwise as it is or in a state of a solution which includes the polymerization initiator, to the cooled raw material solution while being stirring over 0.1 to 1 hours, preferably 0.3 to 0.8 hours and more preferably 0.3 to 0.5 hours. The polymerization initiator can be used in a ratio of 0.01 to 0.6 mol %, preferably 0.05 to 0.55 mol % and more preferably 0.2 to 0.5 mol % based on the total mass of raw material component monomers. Furthermore, when the polymerization initiator is used in a state of a solution which includes the polymerization initiator, the concentration of the polymerization initiator in the solution is preferably 1 to 90% by mass, more preferably 10 to 75% by mass and still more preferably 25 to 65% by mass. Subsequently, the raw material solution to which the polymerization initiator is added is stirred until the temperature becomes 25° C. Then, the solution is heated to a temperature at which the solution is refluxed, and a polymerization reaction is performed over 0.5 to 3 hours until all raw material component monomers have been reacted. The conversion of the raw material component monomers can be controlled by analyzing GC, NMR or IR spectrum.

After the polymerization reaction is completed, the obtained polymer solution is neutralized by adding sodium alkoxide or potassium alkoxide which is equivalent to the aforementioned polymerization initiator, or by stirring with an alkali hydroxide solution which is equivalent to the aforementioned polymerization initiator. After the neutralization, filtration is conducted, and then a hyperbranched polyether polyol, which is a target material, is extracted with a solvent. Subsequently, distillation of the solvent is conducted under reduced pressure to obtain a hyperbranched polyether polyol which is a target material.

(Method 2)

A polymerization initiator is dissolved in an organic solvent so that the amount of the polymerization initiator is 0.1 to 5 mol %, preferably 0.2 to 3.5 mol % and still more preferably 0.25 to 1.0 mol % based on the total molar amount of raw material component monomers. Here, the organic solvent is preferably an organic solvent which does not include peroxide, such as diethyl ether, di-i-propyl ether, di-n-butyl ether, di-i-butyl ether, di-t-butyl ether, t-amyl methyl ether, t-butyl methyl ether, cyclopentyl methyl ether or dioxolane. The organic solvent can be used in the mass ratio such that total mass of raw material component monomers to the mass of an organic solvent is 1:0.25 to 1:5, preferably 1:0.3 to 1:3.5 and more preferably 1:0.5 to 1:2.

A mixture is prepared wherein a hydroxyalkyloxetane (a1) and a monofunctional epoxy compound (a2) are mixed in a ratio (molar basis) of a hydroxyalkyloxetane (a1) to a monofunctional epoxy compound (a2) is 1:1 to 1:10, preferably 1:1 to 1:6 and more preferably 1:1 to 1:3. The polymerization initiator solution is maintained at a temperature of 10 to 60° C., and the prepared mixture is added to the polymerization initiator solution dropwise while it is stirred over 0.1 to 20 hours, preferably over 2 to 10 hours. After the addition is completed, a polymerization reaction is performed at a temperature of 20 to 60° C. until all raw material component monomers have been reacted to form a hyperbranched polyether polyol. After the reaction is completed, neutralization and filtration are conducted similar to the Method 1, and distillation of the solvent is conducted to obtain a hyperbranched polyether polyol which is a target material.

(Method 3)

A hydroxyalkyloxetane (a1) and a monofunctional epoxy compound (a2) are dissolved in a hydrocarbon type solvent, which has a boiling point of 70° C. or more, to prepare a solution, so that the hydroxyalkyloxetane (a1) and the monofunctional epoxy compound (a2) are included in a ratio (molar basis) of a hydroxyalkyloxetane (a1) to a monofunctional epoxy compound (a2) is 1:1 to 1:10, preferably 1:1 to 1:6 and more preferably 1:1 to 1:3. Examples of the hydrocarbon type solvent include n-heptane, i-octane and cyclohexane. From the viewpoint of solubility, cyclohexane is preferably used. The ratio (mass ratio) of raw material component monomers to a hydrocarbon type solvent is preferably such that the ratio of raw material component monomers to a hydrocarbon type solvent is 1:1 to 1:10, more preferably 1:2 to 1:7 and still more preferably 1:2.5 to 1:3.5.

The obtained mixed solution is maintained at a temperature of 0 to 25° C., preferably 5 to 15° C. and still more preferably 10 to 15° C., and then a polymerization initiator, which is 0.01 to 1 mol %, preferably 0.03 to 0.7 mol % and still more preferably 0.05 to 0.15 mol % based on the total amount of the raw material component monomers, is added at once to the solution while it is stirred.

Immediately after the polymerization initiator is added, the inside of the system is ununiform and the temperature in the system increases to 25 to 40° C. After the solution is cooled to 15 to 25° C., the obtained reaction mixture is heat to 40 to 70° C., more preferably 50 to 60° C., and the reaction is performed for 1 to 5 hours, more preferably 2 to 3 hours, until all raw material component monomers are reacted to form a hyperbranched polyether polyol. After the reaction is completed, neutralization and filtration are conducted similar to the Method 1, and then, distillation of the solvent is conducted to obtain a hyperbranched polyether polyol which is a target material.

(Method 4)

A polymerization initiator is dissolved in an a hydrocarbon type organic solvent, which has a boiling point of 70° C. or more, so that the amount of the polymerization initiator is 0.01 to 1 mol %, preferably 0.025 to 0.7 mol % and still more preferably 0.05 to 0.15 mol % based on the total amount of raw material component monomers. The obtained solution is maintained at a temperature of 0 to 25° C., preferably 5 to 15° C. and still more preferably 10 to 15° C. Examples of the hydrocarbon type solvent include n-heptane, i-octane and cyclohexane. From the viewpoint of solubility, cyclohexane is preferably used. The concentration of the polymerization initiator in the hydrocarbon type solvent is preferably 0.01 to 1 mass %, more preferably 0.15 to 0.7 mass % and still more preferably 0.025 to 0.25 mass %.

In the polymerization initiator solution, a mixture in which a hydroxyalkyloxetane (a1) and a monofunctional epoxy compound (a2) are mixed in a ratio (molar basis) of a hydroxyalkyloxetane (a1) to a monofunctional epoxy compound (a2) of 1:1 to 1:10, preferably 1:1 to 1:6 and more preferably 1:1 to 1:3, is added successively and dropwisely so that a temperature in the system is 20 to 35° C.

After the addition is completed, stirring is continued until the temperature in the system becomes 20 to 25° C. Subsequently, the reaction mixture is heated to 40 to 70° C., more preferably 50 to 60° C., and a polymerization reaction is performed for 1 to 5 hours, preferably 2 to 3 hours, until all raw material component monomers have been reacted. The conversion of the raw material component monomers can be controlled by analyzing GC, NMR or IR spectrum. After the reaction is completed, neutralization and filtration are conducted similar to in the Method 1, and then, distillation of the solvent is conducted to obtain a hyperbranched polyether polyol which is a target material.

As the polymerization initiator usable in the present invention, any polymerization initiator can be used as long as problems are not caused. Examples of the polymerization initiator include: bronsted acids such as $H_2SO_4$, HCl, $HBF_4$, $HPF_6$, $HSbF_6$, $HAsF_6$, p-toluenesulfonic acid and trifluoromethane sulfonic acid; lewis acids such as $BF_3$, $AlCl_3$, $TiCl_4$ and $SnCl_4$; onium salt compounds such as triarylsulfonium-hexafluoro phosphate, triarylsulfonium antimonate, diaryl iodonium-hexafluoro phosphate, diaryl iodonium-antimonate, n-benzyl pyridinium-hexafluoro phosphate and n-benzyl pyridinium-antimonate; triphenyl carbonium salts such as triphenyl carbonium-tetrafluoro borate, triphenyl carbonium-hexafluoro phosphate and triphenyl carbonium-hexafluoro antimonite; alkylating agents such as p-toluenesulfonyl chloride, methanesulfonyl chloride, trifluoromethanesulfonyl chloride, p-toluenesulfonic anhydride, methanesulfonic anhydride, trifluoromethanesulfonic anhydride, p-toluenesulfonic acid methyl ester, p-toluenesulfonic acid ethyl ester, methanesulfonic acid methyl ester, trifluoromethane sulfonic acid methyl ester and trifluoromethane sulfonic acid trimethylsilyl ester.

Among these, $HPF_6$, $HSbF_6$, $HAsF_6$, triphenyl carbonium-hexafluoro phosphate and $BF_3$ are preferable due to the excellent activity thereof, and $HPF_6$ triphenyl carbonium-hexafluoro phosphate and $BF_3$ are particularly preferable.

The hyperbranched polyether polyol obtained as described above is characterized in that a primary hydroxyl group (H1) and a secondary hydroxyl group (H2) are included in the molecular structure thereof, a number average molecular weight (Mn) of the hyperbranched polyether polyol is 1000 to 4000 and a hydroxyl value is 150 to 350 mg·KOH/g. These values are preferably in the aforementioned range, since an obtained composition has excellent flowability and can achieve excellent workability can be achieved, and a cured product having a high hardness can be obtained. The hyperbranched polyether polyol is preferably used when a number average molecular weight (Mn) and a hydroxyl value of the hyperbranched polyether polyol are included in the above range. However, it is further preferable that a number average molecular weight thereof is 1300 to 3500 and a hydroxyl value thereof is 170 to 330 in order to achieve the maximum effects.

That is, the hyperbranched polyether polyol of the present invention is a hyperbranched polyether polyol which has a multi-branched structure and is obtained by a ring-opening reaction between a hydroxyalkyloxetane (a1) and a monofunctional epoxy compound (a2), and therefore, the hyperbranched polyether polyol can have low viscosity since the inertia radius thereof is smaller than the inertia radius of a general straight-chain polyol. Furthermore, since the number average molecular weight (Mn) of the hyperbranched polyether polyol is limited to the specific value of 1000 to 4000, flowability can be extremely increased to a level which has not been achieved, and therefore, it is possible to greatly improve the workability when the hyperbranched polyether polyol is used in a urethane resin composition in combination with a polyisocyanate component. When the hydroxyl value thereof is 150 to 350 mg·KOH/g, the hyperbranched polyether polyol can have a lot of hydroxyl groups in spite of the small molecular weight thereof, the cross-link density can increase when curing is conducted, and a hard polyurethane cured product can be obtained.

Furthermore, since the hyperbranched polyether polyol of the present invention has not only a primary hydroxyl group (H1) but also a secondary hydroxyl group (H2) in the molecular structure thereof, it is assumed that it is possible to achieve a long pot life due to the reaction-delay property of the secondary hydroxyl group (H2). Here, a pot life should be estimated comparatively, since it can change depending on conditions.

In the present invention, although the hyperbranched polyether polyol has a secondary hydroxyl group which has low reactivity, it is possible to achieve high hardness of an end cured-product, and the reasons of the characteristic of the present invention are supposed as follows. That is, the molecular structure of the hyperbranched polyether polyol can have a three dimensional structure such as a spherical form and a dendritic form due to the hyperbranched structure thereof. It is believed that hydroxyl groups of the three dimensional structure exist such that they face the outside of the spherical form or the like. Therefore, it is believed that almost all hydroxyl groups can eventually contribute to a reaction even if the reaction rate becomes low, and the crosslinking density of a cured product becomes extremely large. From the viewpoint of balance of a pot life and hardness of a cured product, it is preferable that the number of a secondary hydroxyl group (H2) in one molecule is in a ratio of 20 to 70%, and more preferably 25 to 60%, based on the total number of all hydroxyl group in the molecule. The total number of a hydroxyl group included in a molecule of a hyperbranched polyether polyol of the present invention is preferably 4 or more, and more preferably 4 to 20.

The ratio of the number of a secondary hydroxyl group (H2) to the total number of a hydroxyl group in a hyperbranched polyether polyol can be obtained by conducting analysis of $^{19}F$-NMR subsequent to esterification of a hyperbranched polyether polyol using trifluoroacetic acid.

As the concrete structure of a hyperbranched polyether polyol of the present invention, there are various structures which can be obtained by a ring-opening reaction between a hydroxyalkyloxetane (a1) and a monofunctional epoxy compound (a2). As a concrete example, when a ring-opening reaction is conducted between a hydroxyalkyloxetane (a1) represented by the following general formula (1) and a monofunctional epoxy compound (a2) represented by the following general formula (2), the following structural unit can be generated.

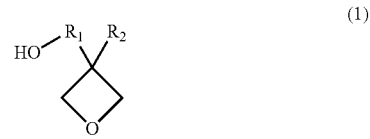

(In the general formula (1), $R_1$ and $R_2$ are the same as those described above.)

(In the general formula (2), $R_3$ represents an organic residue, $R_3$ may form a ring by bonding to a carbon atom, which forms an epoxy group, via a bivalent organic residue, and $R_3$ may be a group which is selected from examples of $R_2$.)

That is, the aforementioned hyperbranched polyether polyol can be structured with a structural unit which can be selected from repeating units and terminal end structural units which are represented by the following structures.

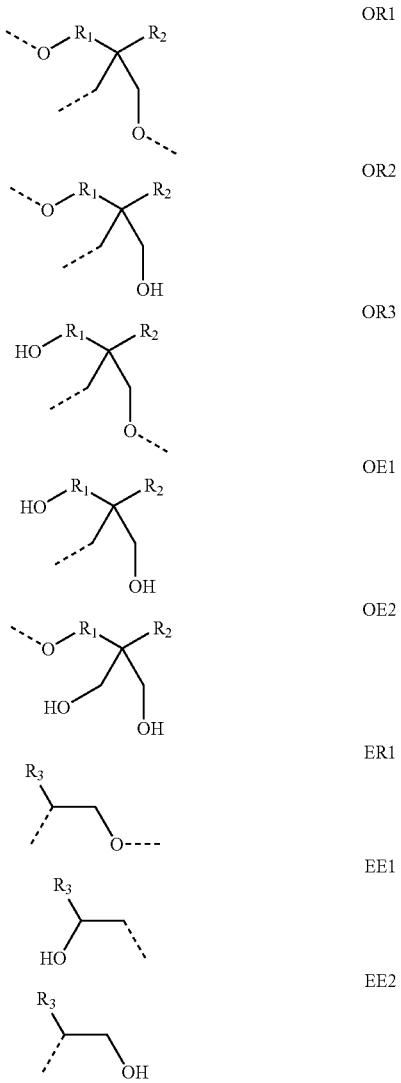

In each structural unit shown above, a solid line represents a single bond within the structural unit, and a broken line represents a single bond which forms an ether linkage between the structural unit and other structural unit. The OR1 to OR3, OE1 and OE2 are structural units originated from a hydroxyalkyloxetane (a1), and among them, OR1 to OR3 represent repeating units and OE1 and OE2 represent terminal end structural units.

ER1, EE1 and EE2 are structural units originated from a monofunctional epoxy compound (a2), and ER1 represents a repeating unit and EE1 and EE2 represent terminal end structural units.

The repeating unit selected from the OR1 to OR3 and ER1 can form a continuous hyperbranched structure of the hyperbranched polyether polyol. Furthermore, the continuous hyperbranched structure can have, at the terminal end thereof, the terminal end structural unit selected from the OE1, OE2, EE1 and EE2. Here, the repeating units and the terminal end structural units may exist in any constitution, any ratio and any amount, in so far as problems are not caused. For example, the repeating units and the terminal end structural units may exist randomly in the hyperbranched polyether polyol. OR1 to OR3 may construct a center position of the molecule structure of the hyperbranched polyether polyol, and the terminal end structural units may exist at the terminal ends of the molecule structure. Here, a secondary hydroxyl group (H2) exists as an essential group, and therefore, EE1 exists in a hyperbranched polyether polyol as an essential unit.

A urethane resin composition of the present invention is a two components type curable composition which includes a polyol component (A) and a polyisocyanate component (B). Furthermore, it is characterized in that the polyol component (A) includes the aforementioned hyperbranched polyether polyol.

In the present invention, it is preferable that a higher fatty acid alkyl ester which has a hydroxyl group is used as well as the hyperbranched polyether polyol from the viewpoint of that hydrophobicity of a mixture wherein two liquids are mixed can be increased and foaming at the time of curing can be prevented.

Examples of the higher fatty acid alkyl ester which has a hydroxyl group are not limited as long as problems are not caused. Examples thereof include; ester compounds having a hydroxyl group, which are obtained by reacting higher fatty acid such as stearic acid and linolic acid, and polyhydric alcohol such as glycol and glycerol, so that a hydroxyl group remains after the reaction; and ester compounds which are obtained by reacting higher fatty acid having a hydroxyl group such as recinoleic acid and a monoalcohol, glycol, glycerol, trimethylol propane or the like; and natural fats and oils which have a hydroxyl group, such as castor oil. These compounds may be used singly or in combination of two or more.

Furthermore, by introducing a hydroxyl group, natural fats and oils such as coconut oil and soybean oil, which do not have a hydroxyl group in an effective amount, can be used as the higher fatty acid alkyl ester having a hydroxyl group. Such a introduction can be conducted by an ester exchange reaction wherein a polyhydric alcohol is used.

Furthermore, among the higher fatty acid alkyl ester having a hydroxyl group, those having a double bond in an alkyl chain thereof can be modified with dicyclopentadiene in order to further improve hydrophobicity, and the modified compounds can be preferably used.

Among the higher fatty acid alkyl ester having a hydroxyl group, those having a hydroxyl value of 100 to 300 mg·KOH/g and/or having the number of carbon atoms within the alkyl chain portion thereof at 10 to 25 are particularly preferable, since remarkable effects of hydrophobicity of a coating can be achieved.

Here, in the polyol component (A), the usage ratio of a hyperbranched polyether polyol to a higher fatty acid alkyl ester, which has a hydroxyl group, can be determined if necessary. It is preferable that the mass ratio of the hyperbranched polyether polyol to the higher fatty acid alkyl ester is 3:7 to 9:1 in order to prevent foaming. Furthermore, it is preferable that the average number of functional groups when the hyperbranched polyether polyol and the higher fatty acid alkyl ester are mixed is 4 or more from the viewpoint of increasing hardness. The upper limit can be determined if necessary.

In the polyol component (A), another polyol can be used in combination with the aforementioned hyperbranched polyether polyol, in an amount such that the effects of the present invention does not deteriorate. Examples of another polyol include; conventionally known mono-chain polyols such as ethylene glycol, diethylene glycol, propylene glycol, dipropylene glycol, 1,4-butanediol, 1,3-butanediol, 3-methyl pentanediol, 3,3-dimethylolheptane and trimethylolpropane; polyalkylene ether polyols which are obtained by polymerizing said mono-chain polyols and alkylene oxides (for example, ethylene oxide, propylene oxide, butylene oxide and styrene oxide); polyester polyols which are obtained by an esterification reaction of said mono-chain polyols and dibasic acids such as phthalic acid, maleic acid, adipic acid, tallow acid, succinic acid and hydrogenated dimer acid; a polyol type xylene formaldehyde resin, polybutadiene polyol, polytetramethylene ether glycol and polyols which are obtained such that polyols are addition-polymerized to epsilon caprolactone. These compounds may be used singly or in combination of two or more.

Next, a polyisocyanate component (B), which can be used in combination with a polyol component (A) in the urethane resin composition of the present invention, is explained. The polyisocyanate component (B) is not limited as long as problems are not caused. The polyisocyanate component (B) can be used singly or in combinations of two or more kinds thereof. For example, conventional aliphatic polyisocyanates and aromatic polyisocyanates can be used as the polyisocyanate component (B).

Here, examples of the aliphatic polyisocyanates include an alkylene diisocyanate such as hexamethylene diisocyanate (hereafter, abbreviated to "HDI"), diisocyanate which has an alicyclic hydrocarbon structure, a trimer of a diisocyanate compound such as biuret modified HDI and isocyanurate modified HDI and an addition reaction product of HDI and trimethylol propane.

Examples of the aromatic polyisocyanates include diphenylmethane diisocyanate (hereinafter, abbreviated to MDI), polymethylene polyphenyl polyisocyanate (hereinafter, abbreviated to polymeric MDI), tolylene diisocyanate (hereinafter, abbreviated to TDI), xylylene diisocyanate (hereinafter, abbreviated to polymeric XDI) and dimers of diisocyanate such as urethodione modified TDI. These compounds may be used singly or in combinations of two or more if necessary.

Among them, in order to improve the hardness of a cured product, aromatic polyisocyanates are preferable, and polymeric MDI is particularly preferable since excellent effects for improving hardness can be achieved. Here, the polymeric MDI described here is obtained such that a high molecular product, which is obtained by polycondensation of aniline and formalin, is isocyanated. The polymeric MDI can be used as a mixture which includes MDI and another compound wherein the number of nucleus (number of a ring) in the compound is larger than that of MDI (for example, MIL-LIONATE MR-200, manufactured by Nippon Polyurethane Industry Co., Ltd.,).

Generally, when the number of nucleus increases, the hardness of a cured product obtained from a composition increases but viscosity of the composition tends to increase. On the other hand, when the number of nucleus decreases, compatibility of the polyisocyanate component (B) with a polyol component (A) becomes well and viscosity decreases, but stability at a low temperature deteriorates since such a aromatic polyisocyanates is easily crystallized. Accordingly, in the present invention, it is preferable that the ratio of the MDI in the polymeric MDI, that is, the ratio of a bifunctional component, is controlled to be 50 to 80% by mass, more preferably 55 to 75% by mass, from the viewpoint of the performance balance thereof. It is particularly preferable that the ratio is 60 to 70% by mass from the view point of prevention of color spot occurrence of a coated surface, that is, from the viewpoint of excellent finish.

Here, as MDI, which can be used singly as the polyisocyanate component (B) or used for controlling the number of a nucleus of polymeric MDI, there are (i) 2,2'-diphenylmethane diisocyanate (hereinafter, abbreviated to 2,2'-MDI), (ii) 2,4'-diphenylmethane diisocyanate (hereinafter, abbreviated to 2,4'-MDI) and (iii) 4,4'-diphenylmethane diisocyanate (hereinafter, abbreviated to 4,4'-MDI). These compounds may be used singly or in combinations of two or more. When the total mass ((i)+(ii)) of (i) 2,2'-MDI and (ii) 2,4'-MDI within MDI is small, the polyisocyanate component (B) tends to crystallize at low temperature. On the other hand, when the total mass ((i)+(ii)) is large, it is difficult to increase the hardness of a cured product. Accordingly, it is preferable that the mass ratio of (i) to (iii) in MDI is ((i)+(ii)):(iii)=5:95 to 40:60, more preferably ((i)+(ii)):(iii)=10:90 to 30:70, from the viewpoint of hardness of a cured product and low temperature stability of the polyisocyanate component (B).

In the present invention, when diisocyanate which has an alicyclic hydrocarbon structure is used singly or in combination as a polyisocyanate (B), an obtained cured film can be hard, have moderate flexibility and have sufficient bridging property regarding cracks. Furthermore, it is possible to reduce yellowing, which is easily caused when aromatic polyisocyanate is used due to ultraviolet ray degradation, and to form a covering surface which is excellent in design.

Any diisocyanate which has an alicyclic hydrocarbon structure can be used as the diisocyanate without limitation, in so far as problems are not caused. Concrete examples thereof include isophorone diisocyanate, hydrogenated xylylene diisocyanate, hydrogenated diphenyl methane diisocyanate, cyclohexane diisocyanate, norbornene diisocyanate, dimethanonaphthalene diisocyanate and polyisocyanates which are obtained by reacting said diisocyanates with polyols. These compounds may be used singly or in combinations of two or more.

Here, examples of the polyols usable for the aforementioned reaction include alkylene diol such as ethylene glycol, diethylene glycol, propylene glycol, dipropylene glycol, tetramethylene glycol, 1,3-butanediol, 3-methylpentanediol, 3,3-dimethylolheptane and trimethylolpropane; and polyalkylene ether polyols which are obtained by polymerizing said alkylene diol with alkylene oxide such as ethylene oxide, propylene oxide, butylene oxide and styrene oxide. Examples of the polyols further include: polyester polyols which are obtained by an esterification reaction of the aforementioned alkylene diol and dibasic acid such as phthalic acid, maleic acid, adipic acid, tallow acid, succinic acid and hydrogenated dimer acid; and polyols which are obtained by copolymerization of the aforementioned alkylene diol and epsilon caprolactone.

Among the examples of the polyol, norbornene diisocyanate and dimethanonaphthalene diisocyanate are particularly preferable, since an excellent balance of hardness and flexibility of a cured film can be achieved.

In the present invention, when the diisocyanate which has an alicyclic hydrocarbon structure is used, excellent effects can be obtained. For example, it is possible to obtain a film which has high elongation such that elongation percentage of a coating is 60% or more, and is also hard such that a cured film has Shore hardness of D-75 or more. Accordingly, when the urethane resin composition of the present invention includes the diisocyanate which has an alicyclic hydrocarbon structure, it is possible to achieve reliable covering ability wherein a film can elongate sufficiently in accordance with cracks of a base substrate sufficiently. Furthermore, such a urethane resin composition has excellent weather resistance and yellow resistance, and therefore, it is possible to provide a covering surface which can maintain its appearance over a long period of time.

Moreover, in the present invention, when the aforementioned diisocyanate, which has an alicyclic hydrocarbon structure, is used as the polyisocyanate component (B), it is furthermore possible to improve flexibility while hardness is maintained by using the diisocyanate in combination with the aforementioned higher fatty acid alkyl ester which has a hydroxyl group.

The urethane resin composition of the present invention is suitable as a covering material. When the urethane resin composition is used as a covering material, a target coating material can be prepared by adding filler, and other various additives if necessary, to the polyol component (A) and the polyisocyanate component (B). The covering material which is obtained from the composition of the present invention has show remarkable properties, for example, such that it can achieve not only a mechanical strength, as a hard covering material which can have Shore hardness of D-75 or more, but also low viscosity and excellent workability. That is, the urethane resin composition of the present invention has excellent characteristics such that the viscosity of a mixture, which is obtained by mixing the polyol component (A) and the polyisocyanate component (B), is controlled to be 1000 mPa·s or less, more preferably 500 mPa·s or more and 800 mPa·s or less. A roller coating or the like can be conducted when the viscosity of the mixture is 1000 mPa·s or less. Here, the measurement of viscosity can be conducted in accordance with JISZ 8803.

A byperbranched polyether polyol and a composition of the present invention can be used in various methods and in various uses as long as problems are not caused. For example, when the composition of the present invention is coated, examples of coating include brush coating, roller coating and spray coating. Of course, rake coating and other coatings can be used.

Examples of the filler include calcium carbonate, surface treated calcium carbonate, aluminium hydroxide, precipitated barium sulfate, clay, silica and talc.

Examples of said other various additives include moisture absorbents such as activated alumina powder, synthetic zeolite, silica gel, diatomaceous earth, slaked lime, quicklime, magnesium hydroxide, anhydrous gypsum, calcium chloride, synthetic hydrotalcite, activated carbon and activated clay; organic or inorganic coloring pigments such as azo pigments, copper phthalocyanine pigments, red iron oxide, chrome yellow, titanium oxide, zinc white and carbon black; rustproof pigments such as red read, white lead, basic chromate, basic lead sulfate, zinc chromate, zinc powder and MIO; and various aids such as a thixotropic agent, a leveling agent, a moisture-absorbent, silane coupling agents and titanate coupling agents. Furthermore, if necessary, it is possible to use a curing catalyst such as various amines and organic metal compounds such as dibutyl tin dilaurate and dibutyl tin diacetate; plasticizer components such as dioctyl phthalate, asphalt and tar; and petroleum based diluent component such as heavy fuel oil and aromatic hydrocarbon, as long as the effects of the present invention do not deteriorate.

The aforementioned fillers and additives can be used singly or in combination of two or more. They can be generally used by mixing them with the polyol component (A) in accordance with conventional methods.

Various methods can be used as a method for coating a covering material, which is prepared using the composition of the present invention, if necessary. One example of the methods is that a polyol component (A) and a polyisocyanate component (B), and fillers and other additive components if necessary, are mixed in a predetermined ratio (ordinary temperature), and then the mixture is coated on a substrate such as concrete, metal, plastics, FRP or a wooded substrate within a pot life to cure the mixture. In the present invention, it is possible to obtain a covering material which is excellent in workability since low viscosity and sufficient pot life can be achieved. Accordingly, it is possible to use, in addition of a trowel coating which requires skill, a roller coating, a brush coating and the like, which do not require skill, and it is also possible to use a spray coating.

Example

Hereinafter, the present invention is explained using Examples in detail, but the present invention is not limited only to the Examples. In the following descriptions, "parts" means parts by mass.

Here, the ratio of a secondary hydroxyl group (H2) with respect to the total number of a hydroxyl group in of the hyperbranched polyether polyols of Examples 1 to 4 and Examples 6 was measured by $^{19}$F-NMR after a hyperbranched polyether polyol is esterified with trifluoroacetic acid.

Synthetic examples of a hyperbranched polyether polyol of the present invention are described below as Examples 1 to 6.

Example 1

Synthesis of a Hyperbranched Polyether Polyol

In a 500 ml three-necked flask equipped with a reflux condenser, a magnetic stirrer and a thermometer, 92.8 g (0.8 mol) of 3-hydroxymethyl-3-ethyloxetane and 46.4 g (0.8 mol) of propylene oxide were dissolved in 200 ml of dried diethyl ether, which did not include peroxide, and then the flask was cooled at −14° C. in an ice bath.

Subsequently, a 60% by mass aqueous solution of 0.97 g of $HPF_6$ was added to the mixture dropwise over 10 minutes. The reaction mixture became slightly milky. Then, the reaction was continued at a room temperature overnight. In the next morning, the generated transparent reaction mixture was further refluxed for 3 hours.

Subsequently, diethyl ether was removed from the obtained resin solution by distillation, and a generated product was washed with an aqueous solution including 2.8 g of KOH and 400 ml of water. Subsequently, the isolated organic layer was washed with 400 ml of deionized water, and diethyl ether was removed again to obtain 136 g of a hyperbranched polyether polyol which was transparent and had a high viscosity. The yield of the hyperbranched polyether polyol was 94%.

Figure 2:
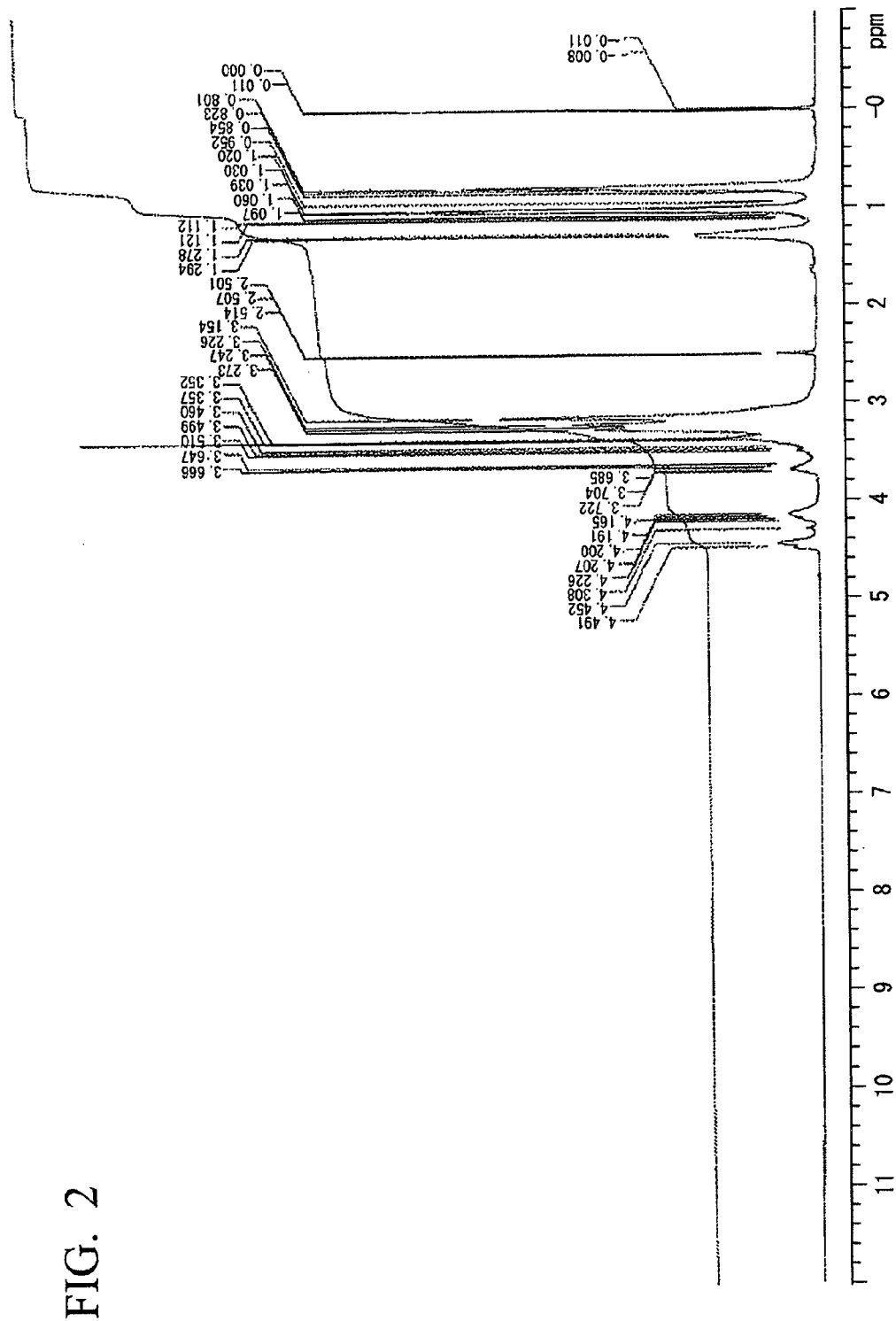
FIG. 2 is a chart of proton NMR of a hyperbranched polyether polyol obtained in Example 1.

The generated hyperbranched polyether polyol had following characteristics: Mn: 1390, Mw: 2520 and a hydroxyl value (hereinafter, abbreviated to OHV): 320 mg·KOH/g, and it was analyzed from proton NMR that the ratio of 3-hydroxymethyl-3-ethyloxetane to propylene oxide was 1:1 (molar basis). The ratio of the number of a secondary hydroxyl group (H2) within the total number of a hydroxyl group was 27.6%. A chart of $^{13}$C-NMR analysis of the hyperbranched polyether polyol was shown as FIG. 1, and a chart of proton NMR analysis thereof was shown as FIG. 2. It was confirmed that a primary hydroxyl group and a secondary hydroxyl group existed in the molecular structure thereof.

Example 2

Synthesis of a Hyperbranched Polyether Polyol

In a 2 L three-necked flask equipped with a reflux condenser, a magnetic stirrer and a thermometer, 348 g (3 mol) of 3-hydroxymethyl-3-ethyloxetane and 348 g (6 mol) of propylene oxide were dissolved in 1 liter of dried diethyl ether, which did not include peroxide, and then the flask was cooled at −14° C. in an ice bath.

Subsequently, a 60% by mass aqueous solution of 5.5 g of $HPF_6$ was added to the mixture dropwise over 10 minutes. The reaction mixture became slightly milky. Then, the reaction was continued at a room temperature overnight. In the next morning, the generated transparent reaction mixture was further refluxed for 3 hours.

Subsequently, the reaction initiator therein was deactivated by adding a 30% by mass methanol solution of 9 g of NaOMe. After filtration was conducted, diethyl ether was removed under reduced pressure at the bath temperature of 75° C. After diethyl ether was completely removed, 667 g of a hyperbranched polyether polyol was obtained. The yield of the hyperbranched polyether polyol was 89%.

Figure 3:
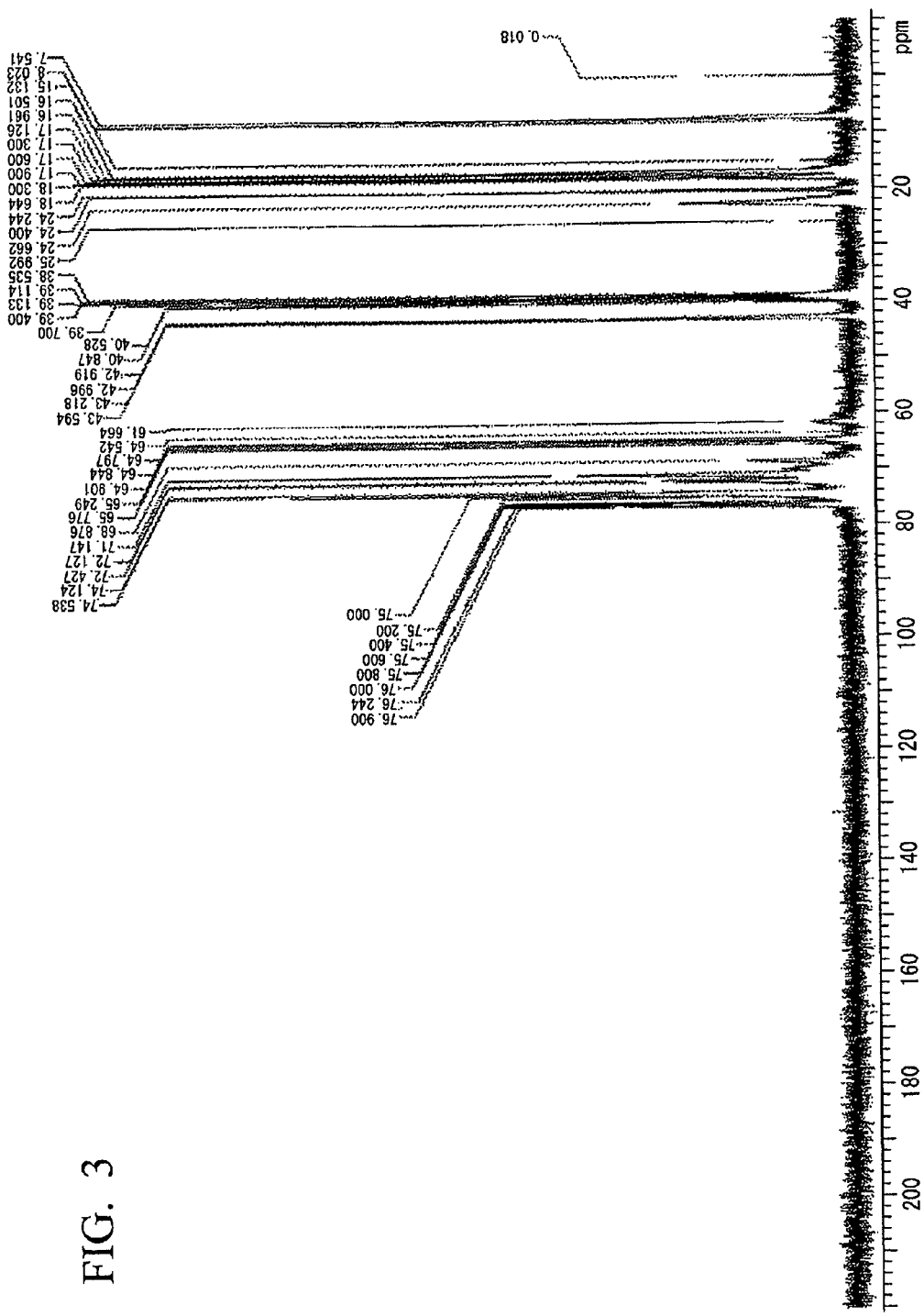
FIG. 3 is a chart of $^{13}$C-NMR of a hyperbranched polyether polyol obtained in Example 2.
Figure 4:
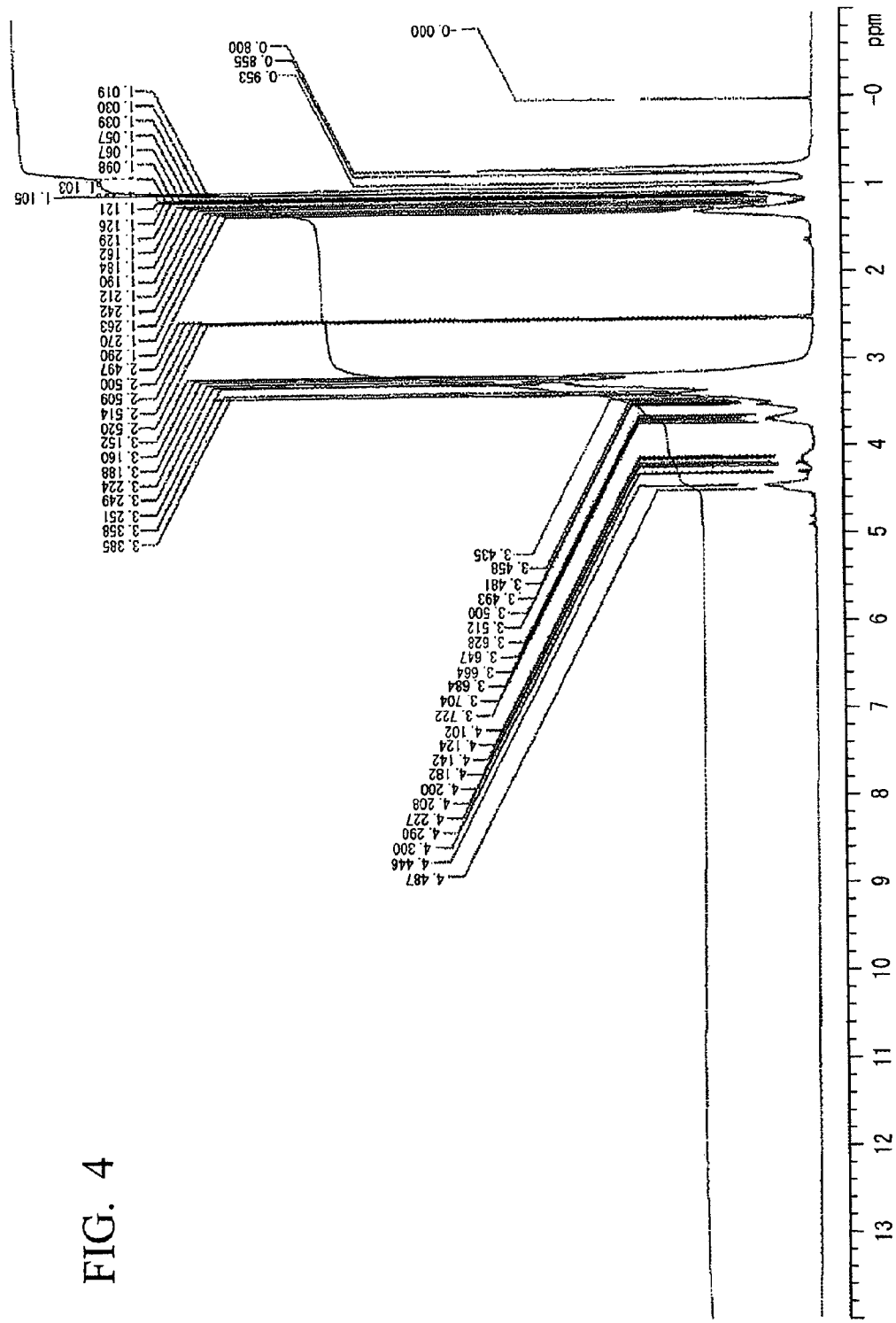
FIG. 4 is a chart of proton NMR of a hyperbranched polyether polyol obtained in Example 2.

The generated hyperbranched polyether polyol had following characteristics: Mn: 1440, Mw: 3350 and OHV: 265 mg·KOH/g, and it was analyzed from proton NMR that the ratio of 3-hydroxymethyl-3-ethyloxetane to propylene oxide was 1:1.9 (molar basis). The ratio of the number of a secondary hydroxyl group (H2) within the total number of a hydroxyl group was 39.0%. A chart of $^{13}$C-NMR analysis of the hyperbranched polyether polyol was shown as FIG. 3, and a chart of proton NMR analysis was shown as FIG. 4. It was confirmed that a primary hydroxyl group and a secondary hydroxyl group existed in the molecular structure thereof.

Example 3

Synthesis of a Hyperbranched Polyether Polyol

In a 500 ml three-necked flask equipped with a reflux condenser, a magnetic stirrer and a thermometer, 69.6 g (0.6 mol) of 3-hydroxymethyl-3-ethyloxetane and 104.4 g (1.8 mol) of propylene oxide were dissolved in 250 ml of dried diethyl ether, which did not include peroxide, and then the flask was cooled at −10° C. in an ice bath.

Subsequently, a 60% by mass aqueous solution of 1.46 g of $HPF_6$ was added to the mixture dropwise over 10 minutes. The reaction mixture became slightly milky. Then, reaction was continued at a room temperature overnight. In the next morning, the generated transparent reaction mixture was further refluxed for 4 hours.

Subsequently, 300 ml of diethyl ether was removed from the resin solution by distillation, and a generated product was washed with an aqueous solution including 2.8 g of KOH and 400 ml of water. Subsequently, the isolated organic layer was washed with 400 ml of deionized water twice, and then, diethyl ether was removed again to obtain a 163.2 g of a hyperbranched polyether polyol which was transparent and low viscosity. The yield of the hyperbranched polyether polyol was 94%.

Figure 5:
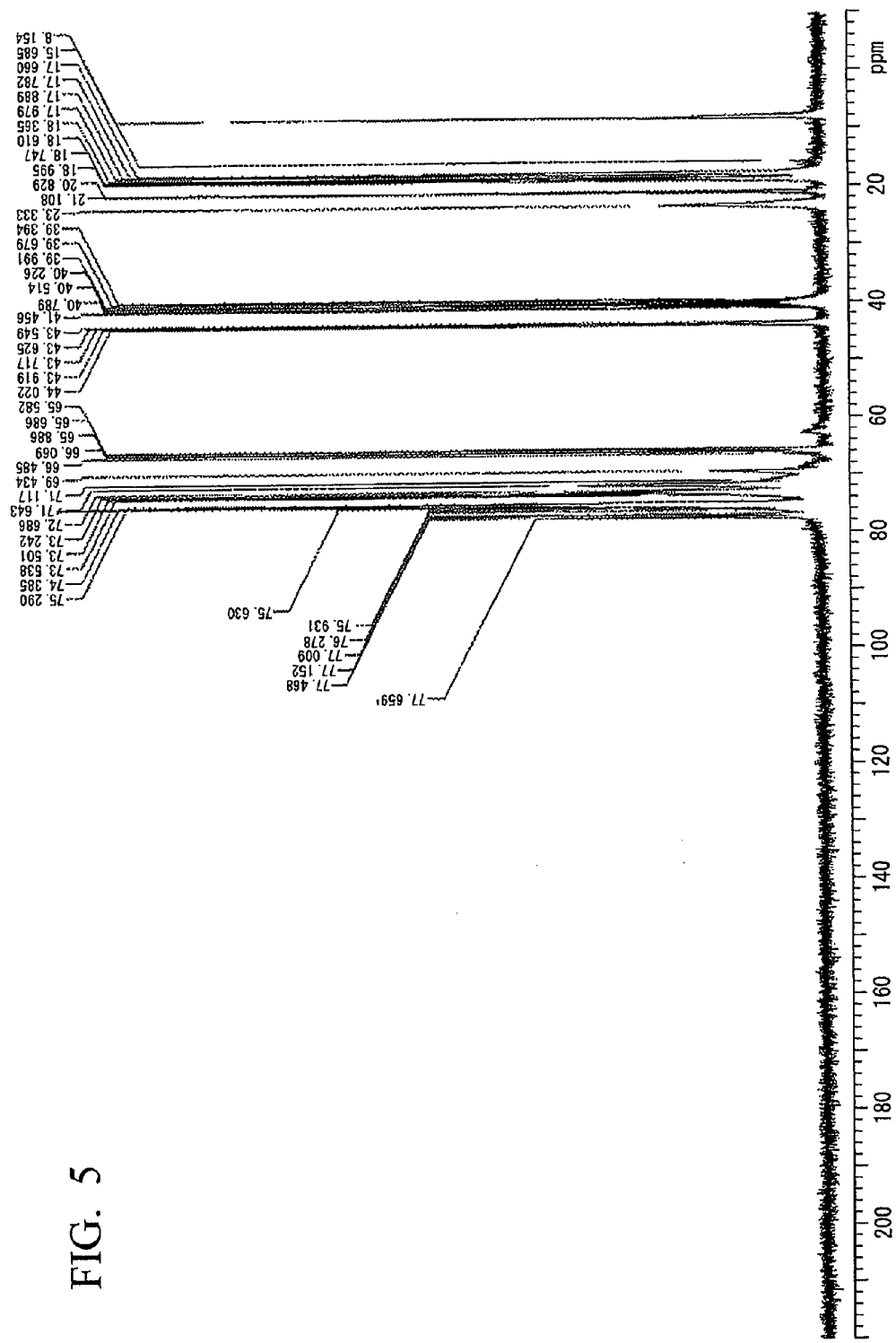
FIG. 5 is a chart of $^{13}$C-NMR of a hyperbranched polyether polyol obtained in Example 3.
Figure 6:
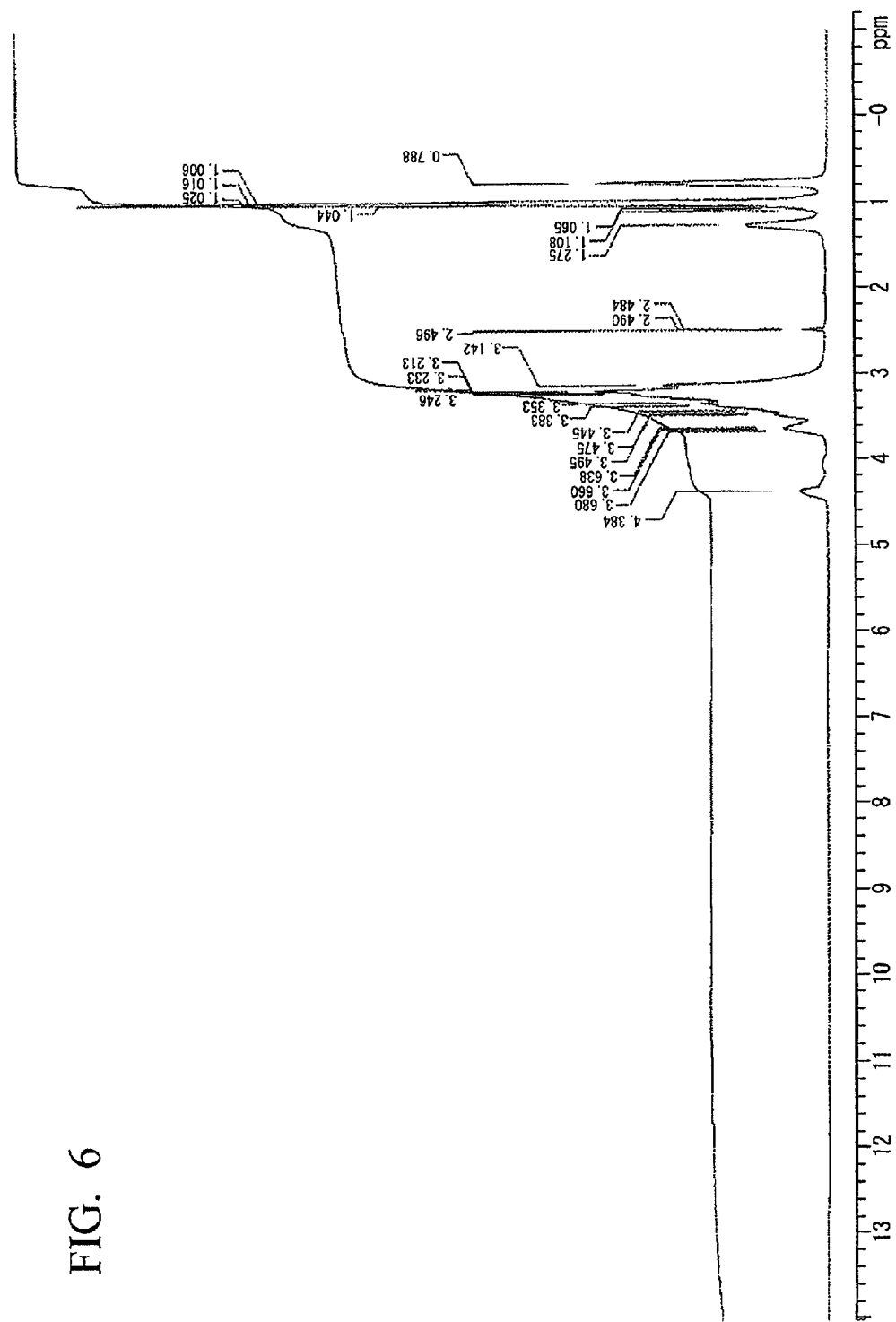
FIG. 6 is a chart of proton NMR of a hyperbranched polyether polyol obtained in Example 3.

The generated hyperbranched polyether polyol had following characteristics: Mn: 1750, Mw: 3630 and OHV: 199 mg·KOH/g, and it was analyzed from proton NMR that the ratio of 3-hydroxymethyl-3-ethyloxetane to propylene oxide was 1:2.9 (molar basis). The ratio of the number of a secondary hydroxyl group (H2) within the total number of a hydroxyl group was 46.3%. A chart of $^{13}$C-NMR analysis of the hyperbranched polyether polyol was shown as FIG. 5, and a chart of proton NMR analysis was shown as FIG. 6. It was confirmed that a primary hydroxyl group and a secondary hydroxyl group existed in the molecular structure thereof.

Example 4

Synthesis of a Hyperbranched Polyether Polyol

In a 500 ml three-necked flask equipped with a reflux condenser, a magnetic stirrer and a thermometer, 139.2 g (1.2 mol) of 3-hydroxymethyl-3-ethyloxetane and 208.8 g (3.6 mol) of propylene oxide were dissolved in 500 ml of dried diethyl ether, which did not include peroxide, and then the flask was cooled at −10° C. in an ice bath.

Subsequently, a 60% by mass aqueous solution of 2.92 g of $HPF_6$ was added to the mixture dropwise over 10 minutes. The reaction mixture became slightly milky. Then, the reaction was continued at a room temperature overnight. In the next morning, the generated transparent reaction mixture was further refluxed for 4 hours.

Subsequently, the reaction initiator therein was deactivated by adding a 30% by mass methanol solution of 3.2 g of NaOMe. After the diethyl ether was completely removed, 310 g of a viscous hyperbranched polyether polyol was obtained. The yield of the hyperbranched polyether polyol was 89%.

Figure 7:
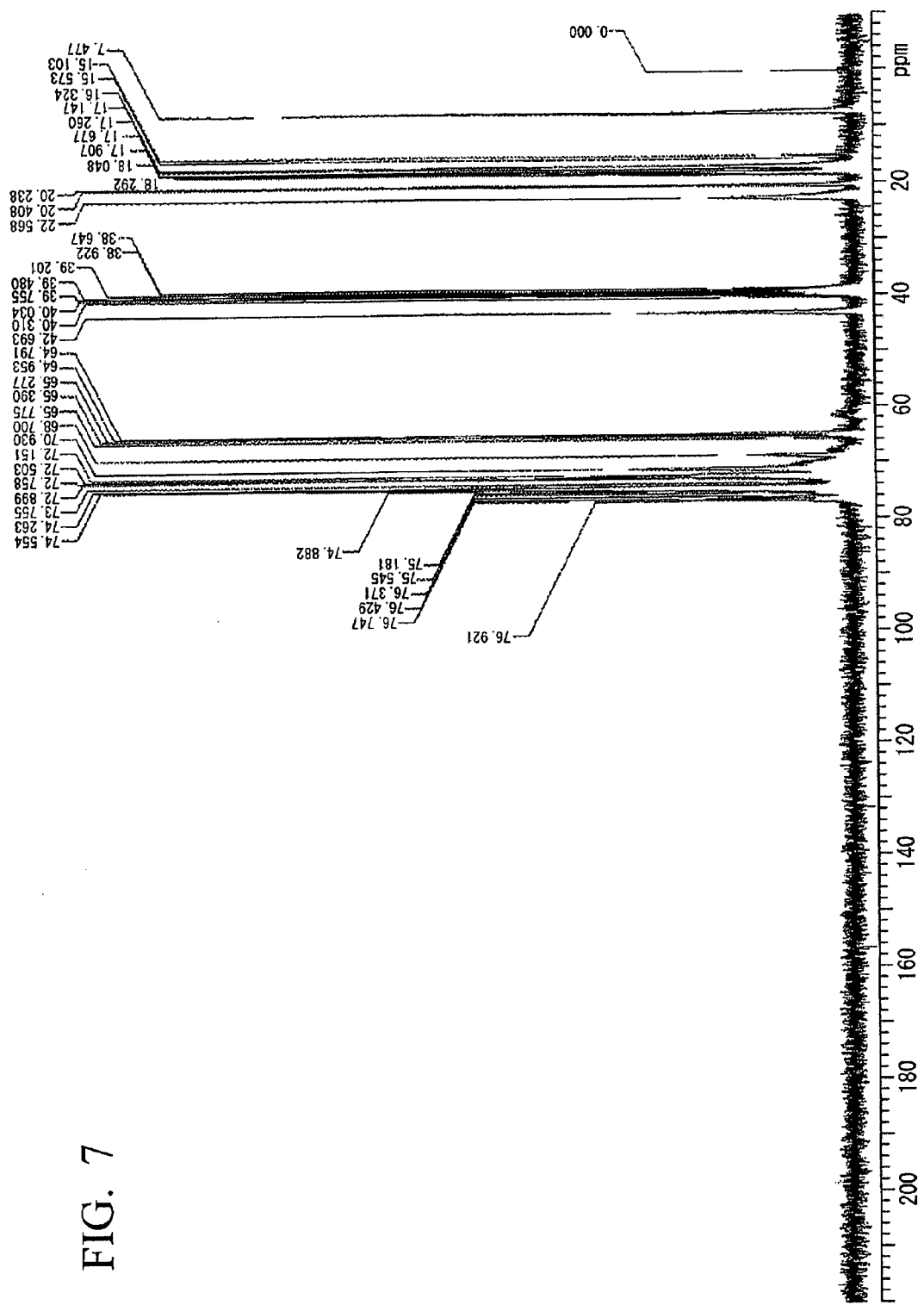
FIG. 7 is a chart of $^{13}$C-NMR of a hyperbranched polyether polyol obtained in Example 4.
Figure 8:
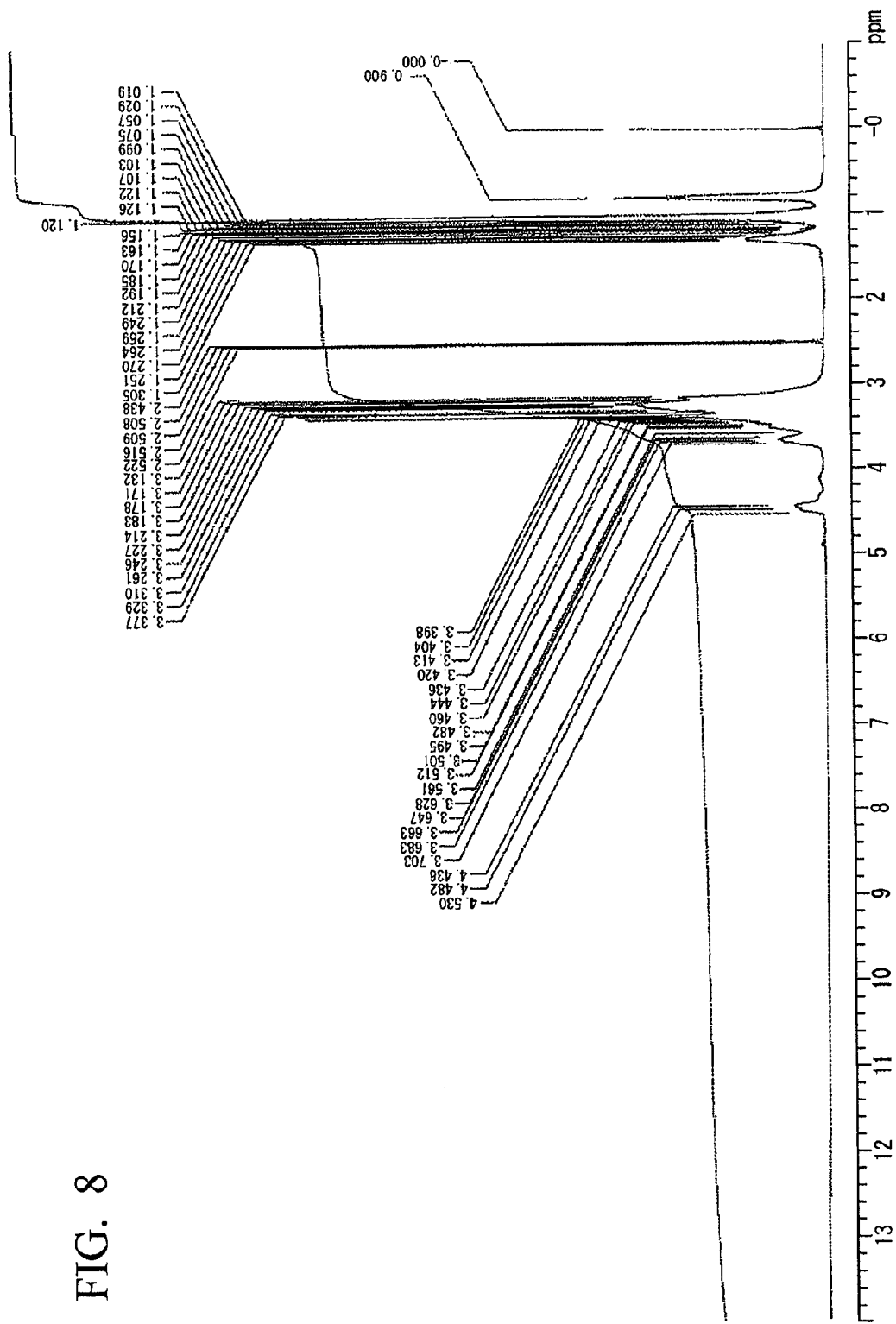
FIG. 8 is a chart of proton NMR of a hyperbranched polyether polyol obtained in Example 4.

The generated hyperbranched polyether polyol had following characteristics: Mn: 1580, Mw: 3710 and OHV: 224 mg·KOH/g, and it was analyzed from proton NMR that the ratio of 3-hydroxymethyl-3-ethyloxetane to propylene oxide was 1:3 (molar basis). The ratio of the number of a secondary hydroxyl group (H2) within the total number of a hydroxyl group was 45.0%. A chart of $^{13}$C-NMR analysis of the hyperbranched polyether polyol was shown as FIG. 7, and a chart of proton NMR analysis was shown as FIG. 8. It was confirmed that a primary hydroxyl group and a secondary hydroxyl group existed in the molecular structure thereof.

Example 5

Synthesis of a Hyperbranched Polyether Polyol

In a 250 ml three-necked flask equipped with a reflux condenser, a magnetic stirrer and a thermometer, 11.6 g (0.1 mol) of 3-hydroxymethyl-3-ethyloxetane and 11.6 g (0.2 mol) of propylene oxide were dissolved in 50 ml of dried cyclohexane, and then the flask was cooled at 10° C. in an ice bath.

Subsequently, a 60% by mass aqueous solution of 0.76 g of $HPF_6$ (0.25 mole % with respect to monomer components) was dissolved in 10 ml of diethyl ether, and the solution was added at once into the flask. The reaction mixture immediately became milky. The reaction temperature of the mixture increased to 36° C. within one hour after the $HPF_6$ was added. Subsequently, the reaction mixture was heated to 54 to 60° C. for one hour in a oil bath and furthermore the mixture was mixed at room temperature overnight. Then, the reaction initiator therein was deactivated by adding a 30% by mass methanol solution of 0.3 g of NaOMe. The milky reaction mixture was further stirred for 4 hours until the pH of the mixture became pH6. The milky layer which was positioned as a lower layer in the reaction mixture was separated, and cyclohexane was completely removed to obtain 18.7 g of a hyperbranched polyether polyol which was transparent and had low viscosity. The yield of the hyperbranched polyether polyol was 79%. The generated hyperbranched polyether polyol had following characteristics: Mn: 2160, Mw: 6310 and OHV: 224 mg·KOH/g, and it was analyzed from proton NMR that the ratio of 3-hydroxymethyl-3-ethyloxetane to propylene oxide was 1:1.9 (molar basis).

Figure 9:
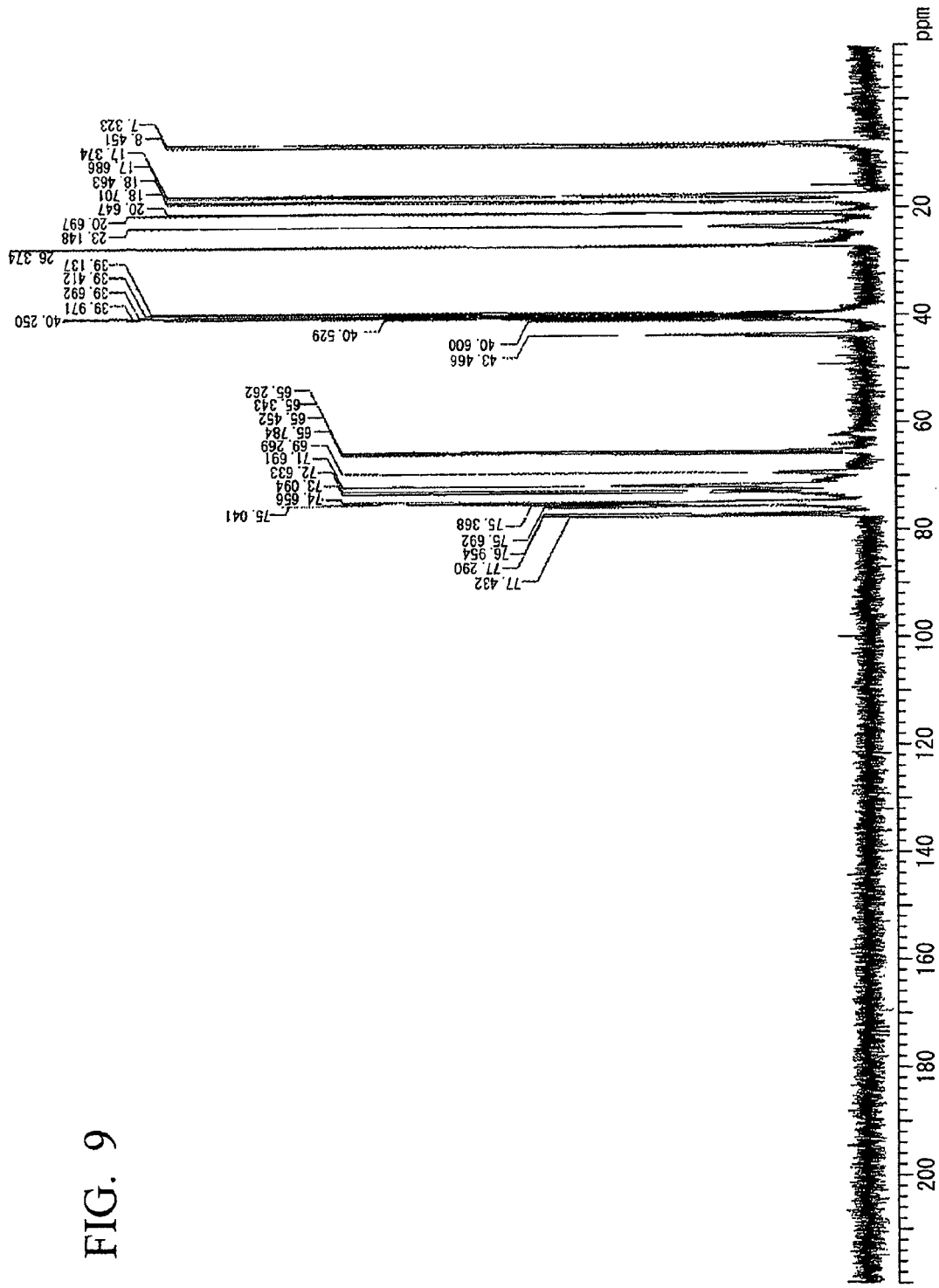
FIG. 9 is a chart of $^{13}$C-NMR of a hyperbranched polyether polyol obtained in Example 5.
Figure 10:
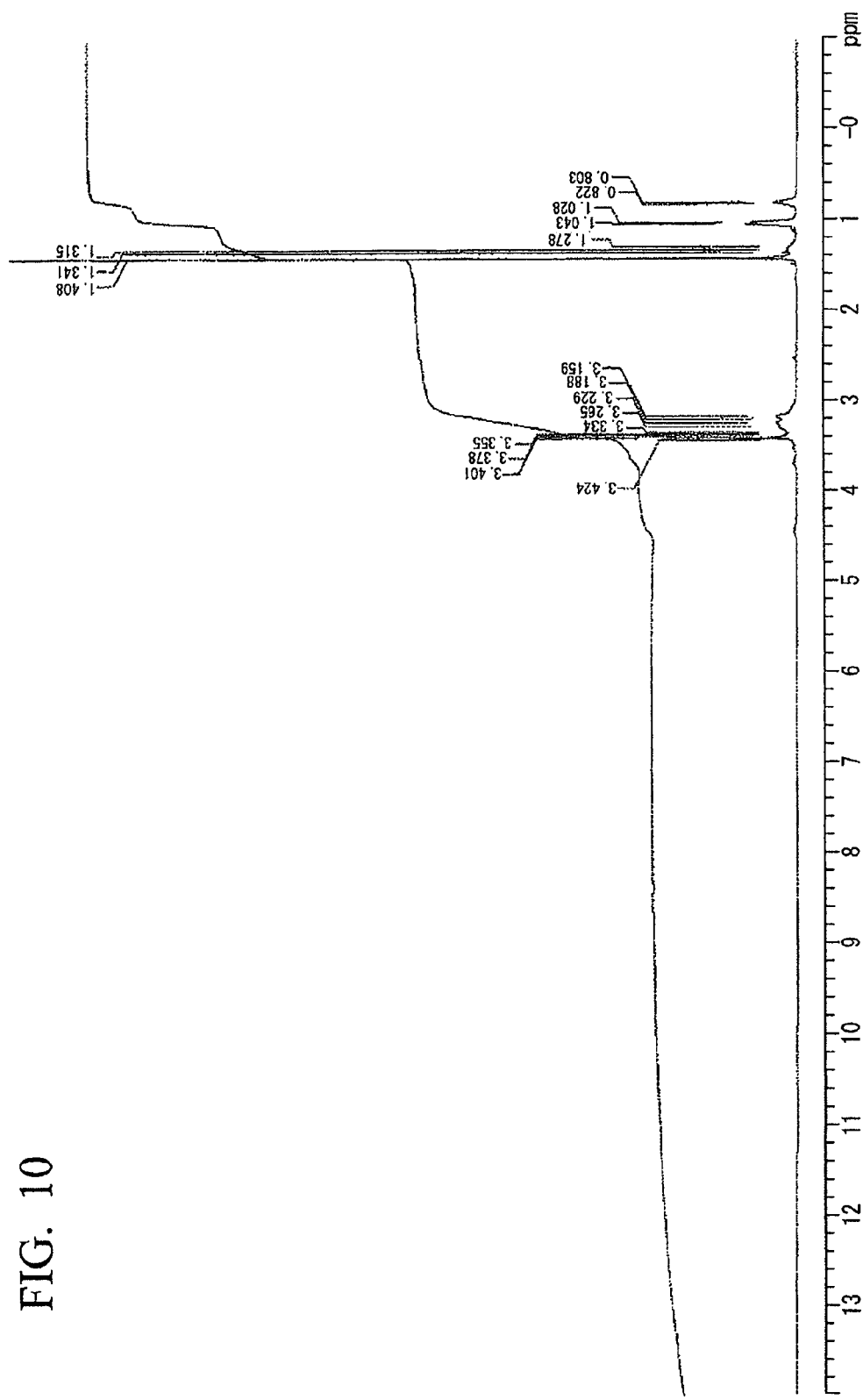
FIG. 10 is a chart of proton NMR of a hyperbranched polyether polyol obtained in Example 5.

On the other hand, the other layer generated in the reaction mixture, that is, a transparent cyclohexane layer which was different from the milky layer, was dried to obtain 1.2 g of a hyperbranched polyether polyol which had low viscosity. The hyperbranched polyether polyol had following characteristics: Mn: 500, Mw: 950 and it was confirmed from proton NMR that the ratio of 3-hydroxymethyl-3-ethyloxetane to propylene oxide was 1:2.1 (molar basis). A chart of $^{13}$C-NMR analysis of the hyperbranched polyether polyol was shown as FIG. 9, and a chart of proton NMR analysis was shown as FIG. 10. It was confirmed that a primary hydroxyl group and a secondary hydroxyl group exist in the molecular structure.

Example 6

Synthesis of a Hyperbranched Polyether Polyol

In a 500 ml three-necked flask equipped with a reflux condenser, a magnetic stirrer and a thermometer, 58.0 g (0.5 mol) of 3-hydroxymethyl-3-ethyloxetane and 106.0 g (1.5 mol) of propylene oxide were dissolved in 500 ml of dried diethyl ether, which did not include peroxide, and then the flask was cooled at −10° C. in an ice bath.

Subsequently, a 60% by mass aqueous solution of 1.0 g of $HPF_6$ (0.25 mole % with respect to monomer components) was added to the mixture dropwise over 30 minutes. The reaction mixture became slightly milky. Then, the reaction was continued at a room temperature overnight. Then, the reaction solution was diluted with 250 ml of diethyl ether, and then washing was conducted with 200 ml of water three times until the ether layer became transparent. After an organic layer was separated, the organic layer was dried with $Na_2SO_4$, and ether was removed by distillation to obtain 149.3 g of a target hyperbranched polyether polyol. The yield of the hyperbranched polyether polyol was 90%.

Figure 11:
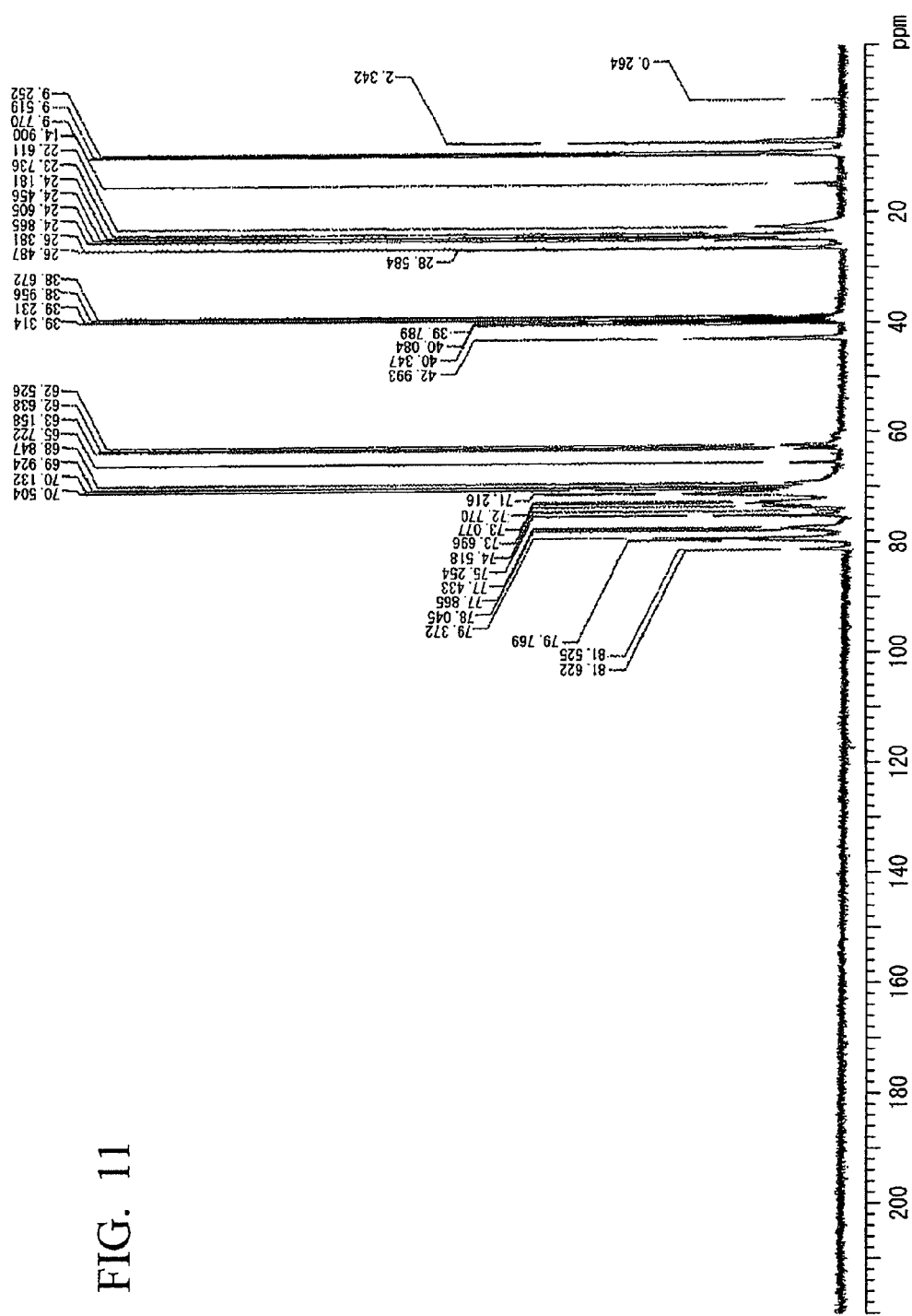
FIG. 11 is a chart of $^{13}$C-NMR of a hyperbranched polyether polyol obtained in Example 6.
Figure 12:
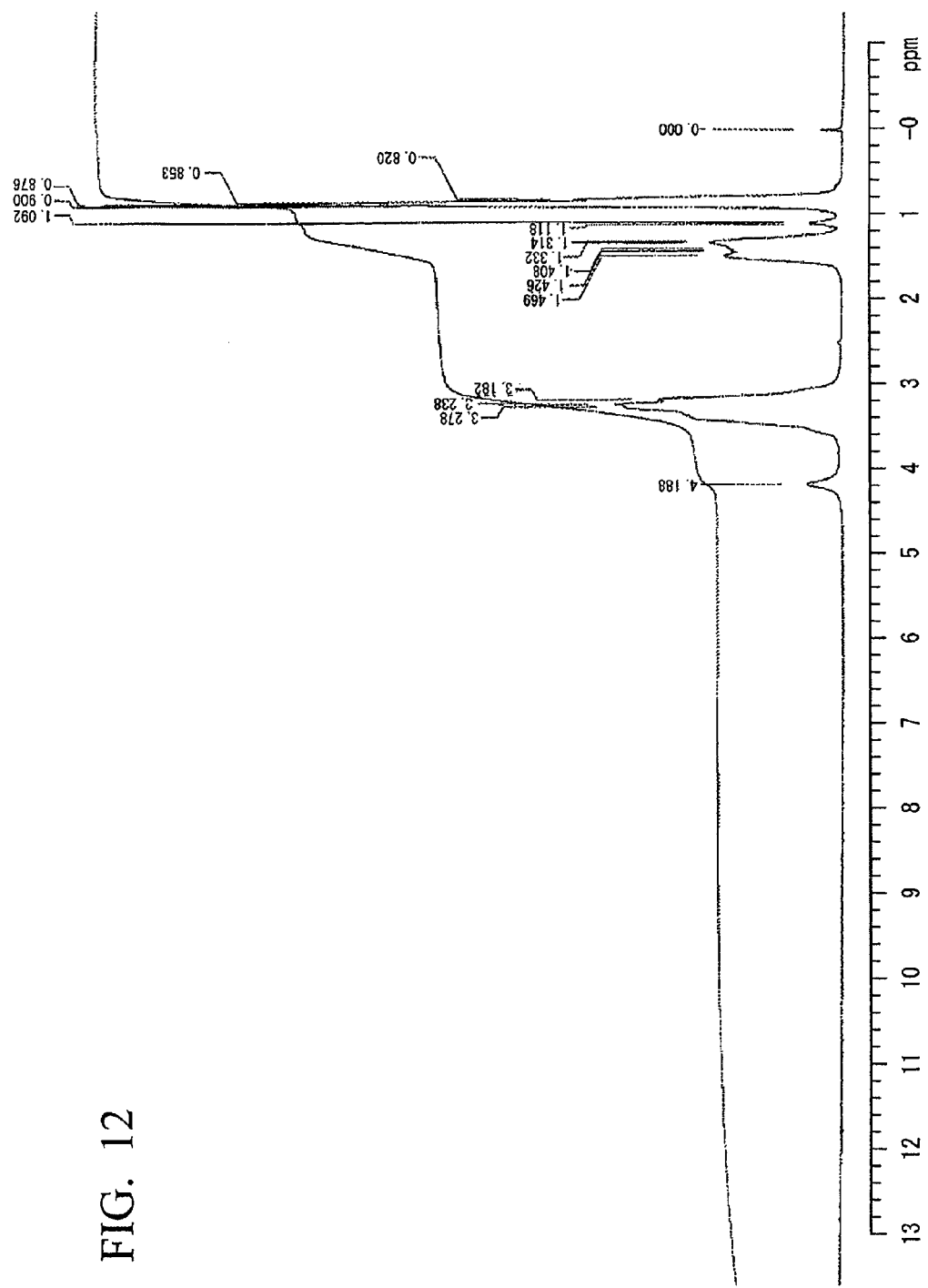
FIG. 12 is a chart of proton NMR of a hyperbranched polyether polyol obtained in Example 6.
Figure 13:
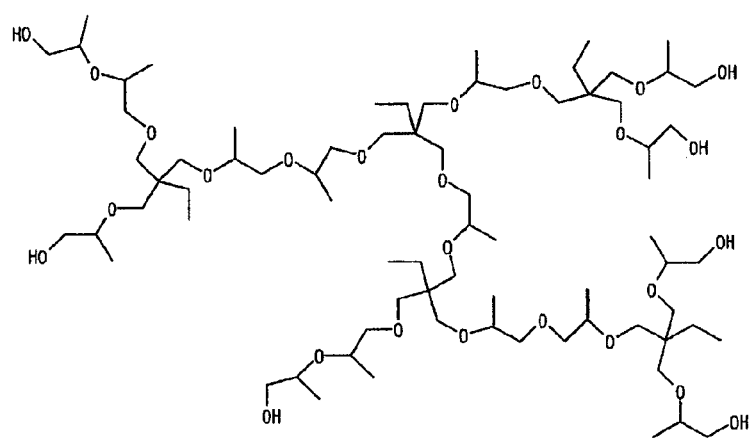
FIG. 13 is a chemical formula which shows an example of a hyperbranched polyether polyol generated in the present invention.
Figure 14:
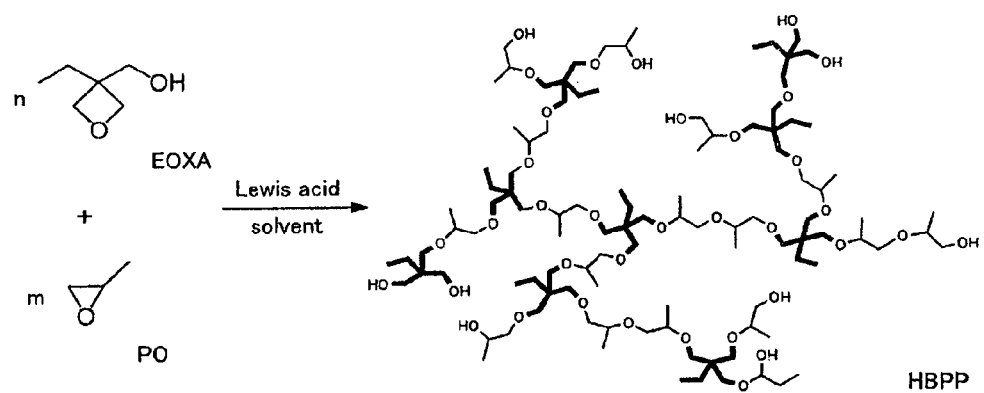
FIG. 14 is a chemical reaction formula which shows an example of formation of a hyperbranched polyether polyol of the present invention.

The generated hyperbranched polyether polyol had following characteristics: Mn: 1540, Mw: 3200 and OHV: 178 mg·KOH/g, and it was confirmed from proton NMR that the ratio of 3-hydroxymethyl-3-ethyloxetane to propylene oxide was 1:3 (molar basis). The ratio of the number of a secondary hydroxyl group (H2) within the total number of a hydroxyl group was 47.0%. A chart of $^{13}$C-NMR analysis of the hyperbranched polyether polyol was shown as FIG. 11, and a chart of proton NMR analysis was shown as FIG. 12. It was confirmed that a primary hydroxyl group and a secondary hydroxyl group existed in the molecular structure thereof.

Hereinafter, examples wherein a hyperbranched polyether polyol of the present invention is used to prepare a polyol component are explained as Reference Examples 1 to 3, and examples wherein other compound is used to prepare a polyol component are explained as Reference Examples 4 to 7.

Reference Example 1

Preparation of a Polyol Component 212 parts of the hyperbranched polyether polyol obtained in Example 2 and 788 parts of castor oil wherein the hydroxyl equivalent thereof was 350 were mixed to obtain a polyol component (A-1) wherein the average hydroxyl equivalent was 316.

Reference Example 2

Preparation of a Polyol Component 120 parts of the hyperbranched polyether polyol obtained in Example 2 and 880 parts of castor oil wherein the hydroxyl equivalent thereof was 350 were mixed to obtain a polyol component (A-2) wherein the average hydroxyl equivalent was 325.

Reference Example 3

Preparation of a Polyol Component 438 parts of the hyperbranched polyether polyol extracted from the milky layer obtained in Example 5 and 562 parts of castor oil wherein the hydroxyl equivalent thereof was 350 were mixed to obtain a polyol component (A-3) wherein the average hydroxyl equivalent was 256.

Reference Example 4

Preparation of a Polyol Component

A polyol component (A-4) wherein the average hydroxyl equivalent was 316 was obtained such that 660 parts by weight of a castor oil having a hydroxyl equivalent of 350 and 340 parts by weight of epoxy ester having an acid value of 0.1, a hydroxyl equivalent of 265 and a molecular weight of 936, wherein the epoxy ester was obtained by reacting 40 parts by weight of a bisphenol A type epoxy resin having an epoxy equivalent of 188 and 60 parts by weight of a castor oil fatty acid at 110° C. for 15 hours under the presence of 0.2 parts by weight of triphenyl phosphine while bubbling was conducted with nitrogen. Here, the aforementioned epoxy ester was different from a hyperbranched polyether polyol of the present invention.

Reference Example 5

Preparation of a Polyol Component 330 parts of EXCENOL 500SO (a propylene oxide addition product of sorbitol, manufactured by Asahi Glass Co., Ltd. with a hydroxyl equivalent of 112, with 6 functional groups, and a molecular weight of 672) and 670 parts of castor oil which have a hydroxyl equivalent of 350 were mixed to obtain a polyol component (A-5) which had an average hydroxyl equivalent of 206. Here, the EXCENOL 500SO was different from a hyperbranched polyether polyol of the present invention.

Reference Example 6

Preparation of a Polyol Component 240 parts of EXCENOL 400 MP (a propylene oxide addition product of trimethylol propane, manufactured by Asahi Glass Co., Ltd. with a hydroxyl equivalent of 138, 3 functional groups, and a molecular weight of 414) and 760 parts of castor oil which had an hydroxyl equivalent of 350 were mixed to obtain a polyol component (A-6) which had an average hydroxyl equivalent of 256. Here, the EXCENOL 400 MP was different from a hyperbranched polyether polyol of the present invention.

19

Reference Example 7

Preparation of a Polyol Component 490 parts of NIKANOL K-140 (a polyol-type xylene formaldehyde resin which has an aromatic ring manufactured by Mitsubishi Gas Chemical Company, Inc. a hydroxyl equivalent of 200, a molecular weight of 756) and 510 parts of castor oil which had hydroxyl equivalent of 350 were mixed to obtain a polyol component (A-7) which had average hydroxyl equivalent of 256. Here, the NIKANOL K-140 was different from a hyperbranched polyether polyol of the present invention.

Reference Example 8

Preparation of an Isocyanate Component 100 parts by weight of commercial crude MDI (MILLIONATE MR-200, manufactured by Nippon Polyurethane Industry Co., Ltd. which includes 60% by mass of polymeric MDI and 40% by mass of MDI, wherein the MDI includes 97% by mass of 4,4'-MDI and 3% by mass of 2,4'-MDI), 26 parts by weight of MDI (LUPRANATE MI, manufactured by BASF INOAC Polyurethanes Ltd., which includes 50% by mass of 4,4'-MDI and 50% by mass of 2,4'-MDI) and 24 parts by weight of 4,4'-MDI (MILLIONATE MT, manufactured by Nippon Polyurethane Industry Co., Ltd.,) to prepare an isocyanate component (B).

Hereinafter, Examples 7 and 8, wherein resin compositions were produced using polyol components which include a hyperbranched polyether polyols of the present invention, and Comparative Examples 1 and 2 wherein polyol components were produced using compounds which were different from those of the preset invention, are explained.

Example 7

The following various evaluations were conducted using the isocyanate component (B) obtained in Reference Example 8 and a compound, which was obtained by uniformly mixing 500 parts of the polyol component (A-1) obtained in Reference Example 1, 460 parts of calcium carbonate and 25 parts of pigment with a planetary mixer while vacuum degassing was conducted, so that the rate of an isocyanate equivalent to a hydroxyl equivalent was 1.15. The results were shown below.

(Evaluation Test of Mixture Viscosity and a Pot Life)

The aforementioned compound which included the component (A) and the component (B) were mixed and maintained in a thermostatic water bath at 25° C. After 5 minutes had been passed, the viscosity of the mixture was measured with a BM type viscometer rotor No. 4 at 6 rpm, and the obtained value was determined as a mixture viscosity. Then, the measurement was continued, and the amount of time it taken for the viscosity of the mixture to reach 50000 Pa·s was measured as a pot life.

(Evaluation Test of Film Properties)

The aforementioned compound which included the component (A) and the component (B) were mixed, and a sheet was formed with the mixture. After aging the sheet for 70 days at a temperature of 25° C., the Shore D hardness (JIS K-6253), the tensile strength (JIS K-6251), the elongation percentage (JIS K-6251) and the tear strength (JIS K-6252) of the sheet were evaluated.

(Evaluation of Surface Foaming of a Covering Surface)

A moisture-curing urethane based primer (PLYADEK T-150-35, manufactured by DIC Corporation) was applied on a slate board, and dried to form a primer layer. Then, the aforementioned compound, which included the component (A), and the component (B) was mixed, and the mixture was applied on the primer layer with a trowel so that the applied amount was 1.5 kg/m². The coating was cured under conditions of 35° C. and 80%, and an evaluation was conducted regarding whether or not foaming was generated on the surface. Here, the evaluation was conducted by visual observation, and when no bubbles were confirmed, it was evaluated as "no foaming", and when bubbles were confirmed, it was evaluated as "foaming".

Example 8

Various performance tests were conducted n a way similar to Example 7 except that the polyol component (A-2) of Reference Example 2 was used. Results were shown in Table 1.

Comparative Example 1

Various performance tests were conducted similar to Example 7 except that the polyol component (A-4) of Reference Example 3 was used. Results were shown in Table 1.

Comparative Example 2

Various performance tests were conducted similar to Example 7 except that the polyol component (A-5) of Reference Example 4 was used. Results were shown in Table 1.

TABLE 1

|  | Example 7 | Example 8 | Comparative Example 1 | Comparative Example 2 |
| --- | --- | --- | --- | --- |
| Isocyanate component | B | B | B | B |
| Polyol component | A-1 | A-2 | A-4 | A-5 |
| Mixture viscosity (mPa·s) | 840 | 790 | 2200 | 1700 |
| Pot life (minute) | 54 | 61 | 59 | 64 |
| Shore D hardness | 75 | 70 | 75 | 78 |
| Tensile strength (MPa) | 16.2 | 12.3 | 15.9 | 16.6 |
| Elongation percentage (%) | 34.1 | 48.4 | 57.8 | 55 |
| Tear strength (N/mm) | 44.5 | 22.3 | 52.1 | 50.1 |
| Surface foaming | No foaming | No foaming | No foaming | Foaming |

As shown in Table 1, the urethane resin compositions of the present invention had low viscosity and were able to form a covering surface wherein foaming was not generated even in a high temperature and a high humidity, the surface was excellent in smoothness and they were sufficiently hard as apparent from the results of the evaluation test of film properties. Pot life of the urethane compositions of the present invention were not poor as compared with that of Comparative Examples. On the other hand, in the Comparative Examples, in a case of the hard urethane covering material which included an aromatic polyol (Comparative Example 1), the prepared composition had high mixture viscosity and did not suit a roller coating or the like. Furthermore, when linear polyfunctional polyol was used (Comparative Example 2), the prepared composition had a high mixture viscosity, and such a viscosity is not preferable since usable coating method is limited. Furthermore, foaming was occurred in the covering surface under the environment of high temperature and high humidity, and therefore smoothness was poor.

Hereinafter, Examples 9 and 10, wherein resin compositions were produced using polyol components which include hyperbranched polyether polyols of the present invention, and Comparative Examples 3 and 4, wherein polyol components were produced using compounds which were different from those of the preset invention, are explained.

Example 9

Evaluations of mixture viscosity, pot life and evaluation test of film properties were conducted in a way similar to Example 7 using a compound, which was obtained by uniformly mixing 500 parts of the polyol component (A-3) obtained in Reference Example 3, 460 parts of calcium carbonate, 25 parts of pigment, and dibutyl tin dilaurate (625 ppm in the compound) with a planetary mixer while vacuum degassing was conducted, and norbornene diisocyanate (diisocyanate which has an alicyclic hydrocarbon structure, hereinafter, abbreviated to NBDI) was used so that the rate of an isocyanate equivalent to a hydroxyl equivalent was 1.15. Furthermore, in accordance with the following methods, an evaluation test for crack bridging property and weather resistance test were conducted. Results were shown in Table 2.

(Evaluation Test of Crack Bridging Property)

An evaluation of crack bridging property was conducted based on the quality standard test for coating material usable for concrete of Japan Highway Public Corporation. The result of the evaluation was shown such that ◎ (acceptable and excellent) was shown when the crack bridging property was 0.8 mm or more, a ○ (acceptable,) was shown when the crack bridging property was 0.4 mm or more, and an X (unacceptable) was shown when the crack bridging property was less than 0.4 mm.

(Test of Weather Resistance)

A test sample was cut off from the sheet, which was prepared in the evaluation test of film properties, to prepare samples for a weather resistance test. As the weather resistance test, an accelerated weather resistance test was conducted using a sunshine weather meter (WEL-SUN-HCH-B type, manufactured by Suga Test Instruments Co., Ltd.,). The test was conducted at 63±3° C. with 18 minutes of rainfall, which fell every 120 minutes, for 1000 hours. The color difference (ΔE) was evaluated using a gray covering material. A color difference value approaching to 0 was preferable.

Example 10

Various performance tests were conducted in a way similar to Example 9 except that DESMODUR W which was hydrogenated MDI (manufactured by Sumika Bayer Urethane Co., Ltd) was used as an isocyanate component. The results are shown in Table 2.

Comparative Example 3

Various performance tests were conducted in a way similar to Example 9 except that the polyol component (A-6) of Reference Example 6 was used. The results are shown in Table 2.

Comparative Example 4

Various performance tests were conducted in a way similar to Example 9 except that the polyol component (A-7) of Reference Example 7 was used, and MILLIONATE MR-200 (polymethylene polyphenylene polyisocyanate, manufactured by Nippon Polyurethane Industry Co., Ltd.) was used as an isocyanate component, and dibutyltin dilaurate was not used. The results are shown in Table 2.

TABLE 2

|  | Example 9 | Example 10 | Comparative Example 3 | Comparative Example 4 |
|---|---|---|---|---|
| Isocyanate component | NBDI | DESMODUR W | NBDI | MR-200 |
| Polyol component | A-3 | A-3 | A-6 | A-7 |
| Average number of functional groups of (a1) | 6.8 | 6.8 | 3 | 4 |
| Mixture viscosity (mPa · s) | 520 | 590 | 390 | 2800 |
| Pot life (minute) | 79 | 84 | 62 | 58 |
| Shore D hardness | 75 | 77 | 55 | 75 |
| Elongation percentage (%) | 72.4 | 64.1 | 134 | 31.8 |
| Crack bridging property | ◎ | ○ | ◎ | X |
| Color difference ΔE | 1.1 | 1 | 1.4 | 10.9 |

As shown in Table 2, the urethane resin composition of the present invention has low viscosity, can form a hard covering surface, and has excellent crack bridging properties. Furthermore, the urethane resin composition of the present invention has characteristics in that the yellowing originated from ultraviolet deterioration is small, and the design is excellent.

On the other hand, in Comparative Examples, when the number of functional groups and the hydroxyl equivalent of polyfunctional polyol is small (Comparative Example 3) when compared with those of the present invention, although crack bridging properties are excellent, it is difficult to prepare a hard product as is apparent from the evaluation test of film properties, for example a Shore D hardness of 55 thereof, and it cannot satisfy performances required as a hard covering material. Furthermore, when an aromatic isocyanate component and a polyol component which does not include a hyperbranched polyether polyol of the present invention is used (Comparative Example 4), the crack bridging properties were poor, dense yellowing was caused in the covering surface, and therefore the appearance was poor, regardless of the polyol component. The pot life was also poor when compared with that of the present invention.

INDUSTRIAL APPLICABILITY

The present invention can provide a new hyperbranched polyether polyol which is useful as a polyol component of a urethane resin composition, and can also provide a urethane resin composition which has excellent workability and is suitable as a covering material which can form a hard cured product.

The invention claimed is:

1. A random copolymerized hyperbranched polyether polyol which is obtained by random copolymerization with a ring-opening reaction between a hydroxyalkyloxetane (a1) and a monofunctional epoxy compound (a2) in a molar ratio (a1)/(a2) of 1/1 to 1/3, wherein neither compound (a1) nor compound (2) has already ring-opened prior to mixing the hydroxyalkyloxetane (a1) and the monofunctional epoxy compound (a2); the hyperbranched polyether polyol has a number average molecular weight (Mn) of 1,000 to 3,500 and a hydroxyl value of 150 to 350 mg·KOH/g, and the hyperbranched polyether polyol includes a primary hydroxyl group (H1) and a secondary hydroxyl group (H2) in the molecular structure thereof, wherein the number of the secondary hydroxyl group (H2) in one molecule of the hyperbranched polyether polyol is in a ratio of 20 to 70% based on the total number of a hydroxyl group in the molecule; and the primary hydroxyl group (H1) and the secondary hydroxyl group (H2) result from the ring-opening reaction between the hydroxyalkyloxetane (a) and the monofunctional epoxy compound (a2).

2. The hyperbranched polyether polyol according to claim 1, wherein the monofunctional epoxy compound (a2) is olefin epoxide.

3. A urethane resin composition which comprises a hyperbranched polyether polyol component (A) and a polyisocyanate component (B) as essential components, wherein the polyol component (A) is a random copolymerized hyperbranched polyether polyol obtained by random copolymerization with a ring-opening reaction between a hydroxyalkyloxetane (a1) and a monofunctional epoxy compound (a2) in a molar ratio (a1)/(a2) of 1/1 to 1/3, wherein neither compound (a1) nor compound (2) has already ring-opened prior to mixing the hydroxyalkyloxetane (a1) and the monofunctional epoxy compound (a2); the hyperbranched polyether polyol has a number average molecular weight (Mn) of 1,000 to 3,500 and a hydroxyl value of 150 to 350 mg·KOH/g, and the hyperbranched polyether polyol includes a primary hydroxyl group (H1) and a secondary hydroxyl group (H2) in the molecular structure thereof, wherein the number of the secondary hydroxyl group (H2) in one molecule of the hyperbranched polyether polyol is in a ratio of 20 to 70% based on the total number of a hydroxyl group in the molecule; and the primary hydroxyl group (H1) and the secondary hydroxyl group (H2) result from the ring-opening reaction between the hydroxyalkyloxetane (a1) and the monofunctional epoxy compound (a2).

4. The urethane resin composition according to claim 3, wherein the polyisocyanate component (B) is polymeric diphenylmethane diisocyanate.

5. The urethane resin composition according to claim 4, wherein the polymeric diphenylmethane diisocyanate includes 50 to 80% by mass of diphenylmethane diisocyanate.

6. The urethane resin composition according to claim 3, wherein the polyisocyanate component (B) is diisocyanate which has an alicyclic hydrocarbon structure.

7. The urethane resin composition according to claim 3, wherein the composition comprises a higher fatty acid alkyl ester, which has a hydroxyl group, in addition to the hyperbranched polyether polyol.

8. The hyperbranched polyether polyol according to claim 1, wherein the hydroxyalkyloxetane (a1) is at least one selected from the group consisting of 3-hydroxymethyl-3-ethyloxetane and 3-hydroxymethyl-3-methyloxetane.

9. The hyperbranched polyether polyol according to claim 1, wherein the monofunctional epoxy compound (a2) is propylene oxide.

* * * * *